(12) United States Patent
Fedorov et al.

(10) Patent No.: US 11,934,551 B2
(45) Date of Patent: Mar. 19, 2024

(54) PROCESSING PER-USE REQUESTS FOR USER DATA

(71) Applicant: UserClouds, Inc., Beaverton, OR (US)

(72) Inventors: Vladimir Fedorov, Menlo Park, CA (US); Stephen Garrity, Sonora, CA (US); Ramanujan Srinivasan, Seattle, WA (US)

(73) Assignee: UserClouds, Inc., Beaverton, OR (US)

( * ) Notice: Subject to any disclaimer, the term of this patent is extended or adjusted under 35 U.S.C. 154(b) by 0 days.

(21) Appl. No.: 18/184,346

(22) Filed: Mar. 15, 2023

(65) Prior Publication Data

US 2023/0297709 A1   Sep. 21, 2023

Related U.S. Application Data

(60) Provisional application No. 63/320,548, filed on Mar. 16, 2022.

(51) Int. Cl.
   *G06F 21/62*   (2013.01)
   *H04L 9/40*    (2022.01)

(52) U.S. Cl.
   CPC .......... *G06F 21/6218* (2013.01); *H04L 63/20* (2013.01)

(58) Field of Classification Search
   CPC ............................ G06F 31/6218; H04L 63/20
   USPC ......................................................... 726/28
   See application file for complete search history.

(56) References Cited

U.S. PATENT DOCUMENTS

| | | | |
|---|---|---|---|
| 2010/0250497 A1* | 9/2010 | Redlich ................ | H04L 63/105 707/661 |
| 2020/0186515 A1* | 6/2020 | Bansal .................. | G06F 9/5027 |
| 2021/0406386 A1* | 12/2021 | Ortiz ...................... | G06N 20/00 |
| 2022/0309180 A1* | 9/2022 | Barbas .................. | G06F 16/221 |

* cited by examiner

*Primary Examiner* — Benjamin A Kaplan
(74) *Attorney, Agent, or Firm* — Van Pelt, Yi & James LLP

(57) ABSTRACT

Processing per-use requests for user data is disclosed, including: receiving a use-specific request to read a set of user data; determining whether to grant the use-specific request based at least in part on an access policy associated with an accessor definition associated with the use-specific request; and in response to a determination to grant the use-specific request, transforming the set of user data based at least in part on the accessor definition.

20 Claims, 14 Drawing Sheets

US 11,934,551 B2

PROCESSING PER-USE REQUESTS FOR USER DATA

CROSS REFERENCE TO OTHER APPLICATIONS

This application claims priority to U.S. Provisional Patent Application No. 63/320,548 entitled PROCESSING PER-USE REQUESTS FOR STORED DATA filed Mar. 16, 2022 which is incorporated herein by reference for all purposes.

BACKGROUND OF THE INVENTION

Today, information of end users of a service, such as emails or phone numbers, flows out into many other systems. However, it is difficult to track where the information has been shared and manage multiple copies of the information that exist in different locations. Where the end user information is of a sensitive nature, it is particularly concerning if not legally noncompliant, if this information is not managed carefully.

BRIEF DESCRIPTION OF THE DRAWINGS

Various embodiments of the invention are disclosed in the following detailed description and the accompanying drawings.

DETAILED DESCRIPTION

Figure 1:
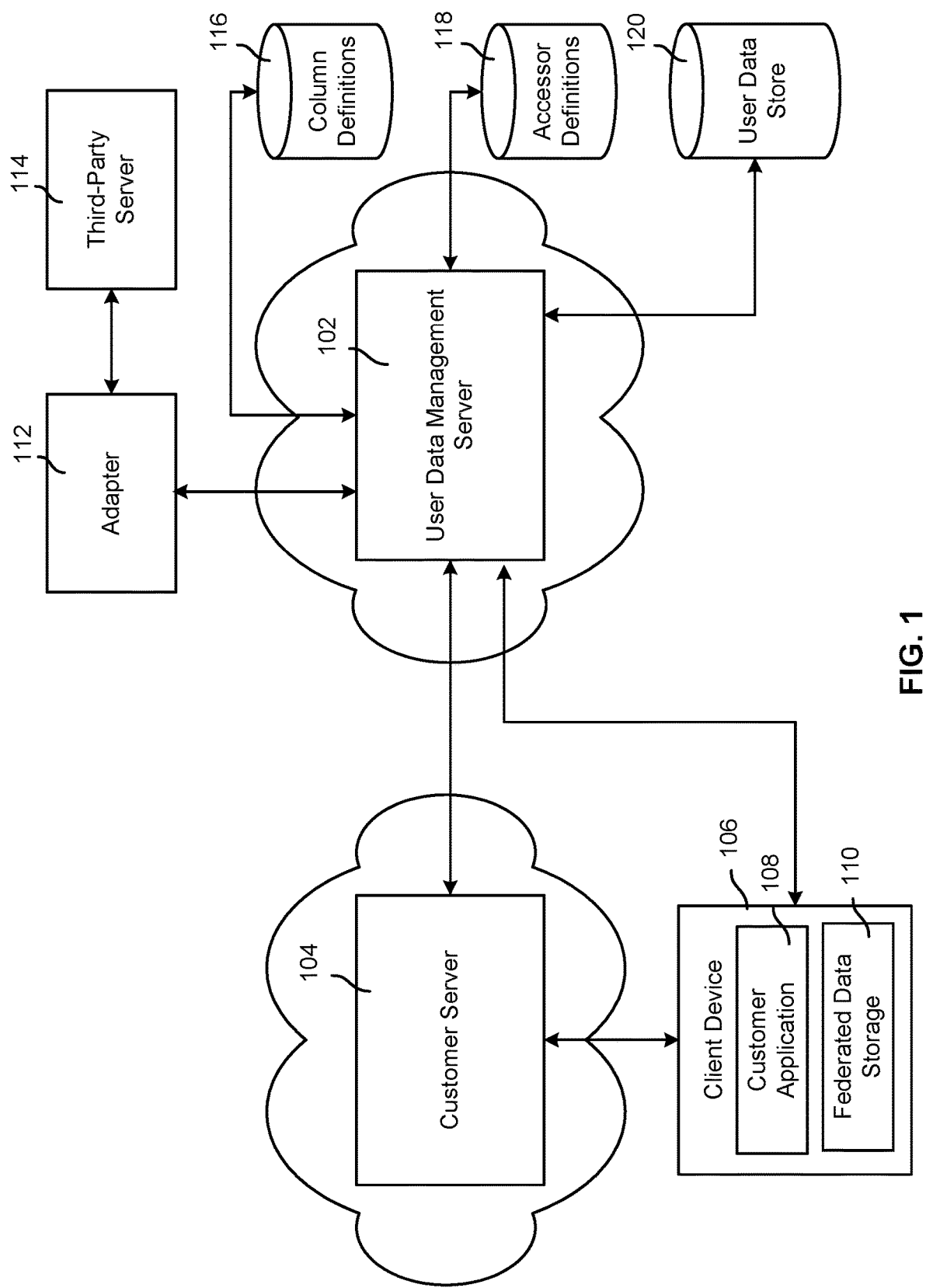
FIG. 1 is a diagram showing an embodiment for processing use-specific requests for user data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of processing use-specific requests for user data are described herein. At design time, definitions of columns in a user data table are obtained from a customer. Furthermore, at design time, definitions of accessors (e.g., application programming interfaces (APIs)) for accessing (e.g., via one of more of create, read, update, or delete (CRUD) operations) user data that is stored at the user data table are obtained from the customer. At runtime, the user data table associated with the customer is populated via requests to create (store) user data and where the requests are processed in accordance with the column definitions and accessor definitions obtained from the customer. Moreover, at runtime, a use-specific request to read a set of user data from the user data table is received. In some embodiments, the read request can specify a use for the user data to be read in the invoked API and/or in an argument that is passed in the request. An example of a use can be a purpose for the desired user data such as integrity, analytics, marketing, operations, product improvements, research, and technical support. Whether the use-specific request is to be granted is determined based at least in part on an access policy associated with an accessor definition associated with the use-specific request. In various embodiments, the use-specific request invokes a particular API whose parameters are defined in a corresponding accessor definition for a read operation. The accessor definition includes an access policy that prescribes conditions that if met by a request invoking that API, then the request should be granted. An example access policy describes permitted purposes/uses of the requested user data and/or authorized roles for accessing the requested user data. The use-specific request is compared to the access policy to determine whether the request is to be granted. In response to a determination to grant the use-specific request, the set of user data is transformed based at least in part on the accessor definition. In various embodiments, an accessor definition for a read operation optionally describes that the requested user data should be first transformed before it is returned to the requestor or otherwise passed to a requested destination. Examples of data transformation include randomization, derivation, or tokenization.

IG. 1 is a diagram showing an embodiment for processing use-specific requests for user data.

Customer server 104 comprises a server (e.g., that is hosted in a cloud) that is configured to perform a service by exchanging data with client devices, such as client device 106, each of which executes a software application (customer application 108) that is configured to communicate with customer server 104. An example of a client device can be a desktop computer, a laptop computer, a mobile device, a tablet device, or any type of computing device. End users use the service provided by customer server 104 through interacting with customer application 108 that is executing on their respective client devices. In the course of providing relevant and/or customized service to end users, customer server 104 may be configured to obtain user data from the end users via the client devices. For example, an end user may be invited to create an account with the service that is provided by customer server 104 and in response, submit the requested user data such as his or her name, address, email, and phone number via the customer application executing at his or her client device. Due to the potentially sensitive nature (e.g., the data can be used to personally identify an individual) of at least a portion of the user data that is obtained from an end user, the organization operating customer server 104 may want to ensure that access to such data is controlled in a way that prevents undesired leaks and/or is denied to unauthorized parties.

User data management server 102 is configured to centrally manage access to user data at user data store 120. For example, user data management server 102 is hosted in a cloud. In some embodiments, user data store 120 is physically proximate to user data management server 102. In some embodiments, user data store 120 is hosted in a separate cloud from the one in which user data management server 102 is hosted. In some embodiments, user data store 120 comprises a distributed storage and where different instances of the user data store are located in different geographical locations. User data management server 102 is configured to maintain a respective user data table corresponding to each customer (e.g., the customer associated with customer server 104) to store user data associated with end users of that customer. In various embodiments, the user data table corresponding to each customer includes columns that are described by a corresponding set of column definitions (stored at column definitions 116) that have been configured and submitted by that particular customer. During design time, prior to runtime during which user data is stored or otherwise accessed, a customer could have configured column definitions that describe the name and properties of each column in which user data belonging to its end users could be stored and submitted such column definitions to user data management server 102. In some embodiments, a set of column definitions can provide a federation policy associated with one or more columns that dictates that the user data to be stored/updated at those column(s) should not be stored at user data store 120 but in the end user's own client device 106. For example, user data that is to be stored locally at an end user's client device (e.g., federated data storage 110 of client device 106) is data that the end user would likely want to reserve more control over the reading thereof. Furthermore, during design time, a customer could have also configured accessor definitions (stored at accessor definitions 118) comprising API definitions for accessing the user data that is to be stored at its corresponding user data table (which is described by a corresponding set of column definitions stored at column definitions 116) at user data store 120. In some embodiments, an accessor definition can sometimes be referred to as a "CRUD API." In various embodiments, each API definition describes at least an API name, one type of operation (among create, read, update, or delete (CRUD)), one or more column names of the user data table on which the API operates, a selector for filtering, and an access policy. For example, the "selector" in an API definition allows for filtering similar to the WHERE clause in SQL. The "selector" takes a form of checking which rows in the user table store satisfy a logical condition such as, for example, name==X and zipcode==Y. The "selector" in an API definition can contain a variety of logical operators and only rows for which the selector expression is true are returned when this API is invoked. In some embodiments, an access policy (or reference thereof) defines which roles are authorized to access user data using this API and which one or more purposes/uses for which this access of user data is permitted using this API. For a particular customer's user data table stored at user data store 120, the customer may have defined potentially hundreds or thousands of corresponding accessor definitions stored at accessor definitions 118, where each accessor definition is associated with a distinct name and different combinations of operation types (e.g., create, read, update, and delete), affected column names, selectors, and access policies. For example, an accessor definition can be expressed as an SQL query, a GraphQL query, or another data fetching language.

At runtime, user data of an end user is obtained by customer application 108 executing at client device 106 during the course of the end user using the service (e.g., creating an account with the service) that is provided by customer server 104. In some embodiments, the request to store user data is either directly requested by client application 108, or the user data is first sent to customer server 104 and then requested by customer server 104 to be stored at a corresponding user data table at user data store 120. As such, user data management server 102 is configured to receive a request (e.g., an API call) to create/store the user data from the requestor (e.g., client application 108 or customer server 104). In response to the request to create/store the user data, user data management server 102 is configured to determine the relevant accessor definition for a create operation from accessor definitions 118 and at least compare the specified use associated with the request to the access policy identified by that accessor definition to determine whether the request should be granted. For example, the use specified for the create request may be included in an argument in the request. In the event that the read request is to be granted in light of the relevant accessor definition, where a column to which the requested user data is to be stored is associated with a federation policy according to column definitions stored at column definitions 116, then that user data is caused by user data management server 102 to be stored at federated data storage 110, which is local to client device 106 belonging to the end user associated with the data. For example, in order for user data management server 102 to instruct client device 106 to store data locally to (e.g., a local instance of a user data table in) federated data storage 110, client device 106 is configured to be running an application (client application 106) that includes a software development kit (SDK) associated with the services provided by user data management server 102. This SDK will handle presenting a prompt at client device 106 to obtain end user approval to access the data at federated data storage 110 and communicating with user data management server 102 to create/store, update, or read a field in federated data storage 110. Otherwise, where a column to which the requested user data is to be stored is not associated with a federation policy according to column definitions stored at column definitions 116, then that user data is caused by user data is management server 102 to be stored at the column(s) of user data store 120.

At runtime, after user data associated with the customer is stored at the corresponding user data table at user data store 120, in some embodiments, user data management server 102 is configured to receive a request (e.g., an API call) to read user data stored at the user data table. In response to the request to read the user data, user data management server 102 is configured to determine the relevant accessor definition for a read operation from accessor definitions 118 and at least compare the specified use associated with the request to the access policy identified by that accessor definition to determine whether the request should be granted. For example, the use specified for the read request may be included in an argument in the request. Also, for example, the read request may have originated from customer server 104, client application 108, or another entity (e.g., third-party server 114). In some embodiments, an accessor definition for a read operation can include a data transform that specifies whether the requested user data (in the event that the read request is granted) should be transformed prior to being sent to the requested destination (e.g., the party that had sent the read request or a third-party) and if, which type of transformation should be performed. As will be described in further detail below, some example types of data transformations include randomization, derivation, and tokenization. In the event that the read request is to be granted in light of the relevant accessor definition and the accessor definition specifies a data transformation, user data management server 102 is configured to obtain the requested user data from the user data table of user data store 120 and then transform the data accordingly, before sending the transformed user data to the requested destination.

At runtime, updated user data of an end user may be obtained by customer application 108 executing at client device 106 during the course of using the service (e.g., updating an account with the service or using a new feature of the service) that is provided by customer server 104. In some embodiments, the updated user data is either directly requested by client application 108 to be stored, or the updated user data is first sent to customer server 104 and then requested by customer server 104 to be stored at a corresponding user data table at user data store 120. As such, user data management server 102 is configured to receive a request (e.g., an API call) to store the updated user data from the requestor (e.g., client application 108 or customer server 104). In response to the request to update the user data, user data management server 102 is configured to determine the relevant accessor definition for an updated operation from accessor definitions 118 and at least compare the specified use associated with the request to the access policy identified by that accessor definition to determine whether the request should be granted. For example, the use specified for the update request may be included in an argument in the request. In the event that the update request is to be granted in light of the relevant accessor definition, where a column to which the user data is requested to be updated is associated with a federation policy according to column definitions stored at column definitions 116, then that user data is caused by user data management server 102 to be updated at federated data storage 110, which is local to client device 106 belonging to the end user associated with the data. Otherwise, where a column to which the user data is requested to be updated is not associated with a federation policy according to column definitions stored at column definitions 116, then that user data is caused by user data management server 102 to be updated at the column(s) of user data store 120.

At runtime, after user data associated with the customer is stored at the corresponding user data table at user data store 120, in some embodiments, user data management server 102 is configured to receive a request (e.g., an API call) to delete user data stored at the user data table. In response to the request to delete the user data, user data management server 102 is configured to determine the relevant accessor definition for a delete operation from accessor definitions 118 and at least compare the specified use associated with the request to the access policy identified by that accessor definition to determine whether the request should be granted. For example, the use specified for the delete request may be included in an argument in the request. Also, for example, the delete request may have originated from customer server 104, client application 108, or another entity (e.g., third-party server 114). In the event that the delete request is to be granted in light of the relevant accessor definition, where a column to which the user data is requested to be updated is associated with a federation policy according to column definitions stored at column definitions 116, then that user data is caused by user data management server 102 to be deleted from federated data storage 110, which is local to client device 106 belonging to the end user associated with the data. Otherwise, where a column to which the user data is requested to be updated is not associated with a federation policy according to column definitions stored at column definitions 116, then that user data is caused by user data management server 102 to be deleted (or at least marked for deletion) from the column(s) of user data store 120.

In various embodiments, adapter 112 comprises logic and one or more integration accessor definitions that are usable by a third-party server (e.g., third-party server 114) to request user data stored at user data store 120. For example, while user data store 120 is configured to store end user data belonging to end users of a service provided by customer server 104 and/or customer application 108 and as such, requests received at user data management server 102 to create, read, update, or delete such data typically originate from customer server 104 and/or customer application 108, in some instances, some such requests can originate from third-party server 114. This is because third-party server 114 (e.g., data analytics, marketing, customer support) provides a third-party service that is consumed by the service provided by customer server 104 and/or customer application 108 and as such, it would be advantageous for third-party server 114 to directly interact with user data management server 102 to obtain the desired user data in order to perform a service on behalf of customer server 104/client application 108. In some embodiments, the configurations and integration accessor definitions of adapter 112 have been tested with one or more third-party servers (e.g., third-party server 114) to ensure that those third-party servers can successfully retrieve the requested data from user data management server 102. In some embodiments, the integration accessor definitions of adapter 112 are stored at accessor definitions 118. In some embodiments, an administrator user associated with customer server 104 can customize adapter 112 by providing its credentials to the third-party service provided by third-party server 114. In some embodiments, customer server 104 could leverage adapter 112 by configuring adapter 112 to request user data to send to third-party server 114. In some embodiments, third-party server 114 can directly request user data from user data management server 102 via adapter 112. In a specific example, customer server 104 can configure adapter 112 to request user data to be read from a corresponding user data table of user data store 120, tokenized, and then sent to third-party server 114. Third-party server 114 could then (e.g., in response to a trigger) request user data management server 102 to resolve the tokens, which user data management server 102 could perform in accordance with stored token resolution policies.

As shown by FIG. 1, user data management server 102 provides a central management of user data for different types of requests for such data. User data management server 102 can store data at user data store 120, which could be a distributed storage, or at end user client devices based on customizable columns associated with user data tables. User data management server 102 can enforce access policies for requested stored user data in accordance with accessor definitions that are bespoke for not only operation types (e.g., create, read, update, delete), the affected columns of the relevant user data tables, but also permitted uses. In particular, user data management server 102 can confirm that each use-specific request matches a permitted use/purpose before granting and processing the request, which prevents accesses to data for unpermitted uses. Moreover, user data management server 102 can transform requested user data and then return the transformed user data to provide still another layer of protection of user data for which access is granted.

In various embodiments, user data management server 102 is configured to provide a centralized data store for sensitive information such as personally identifiable information (PII) combined together with a set of per-use accessor methods that describe the policies for accessing that data. In some embodiments, user data management server 102 is meant to contain the only stored copy of that user data and while other services can obtain copies of that data for a particular purpose, those other services should delete the obtained copies of the data once that purpose is complete (e.g., application developers should perform regular data discovery processes across their data sets to ensure that copies of PII data are not persisted beyond their intended purpose). Instead of using a generic API/language for accessing data as is state of the art today, in various embodiments, a per-use custom accessor (associated with policy, reference to approval processes, etc.) can be defined for each particular use of data. That way, each use of data can be audited, turned off, or constrained without impacting other uses. In some embodiments, user data management server 102 leverages a set of adapters to make integrations with (e.g., common) third-party services unimpacted by removing, masking, tokenizing, or making less precise the literal user data in the data set.

In some embodiments, user data management server 102 is configured to provide several sets of APIs to a customer including the following examples:
- A) Management—the APIs for configuring and maintaining the user data store and associated policies. Examples of this type of API include those for obtaining column definitions and accessor definitions.
- B) Operations—the APIs used for online, offline, and adapter access to the user is data. Examples of this type of API include those for creating, reading, updating, and deleting user data at the user data store.
- C) Audit—the APIs used for compliance purposes to verify, confirm correctness, and integrate with internal processes such as approval flows and documentation.

Figure 2:
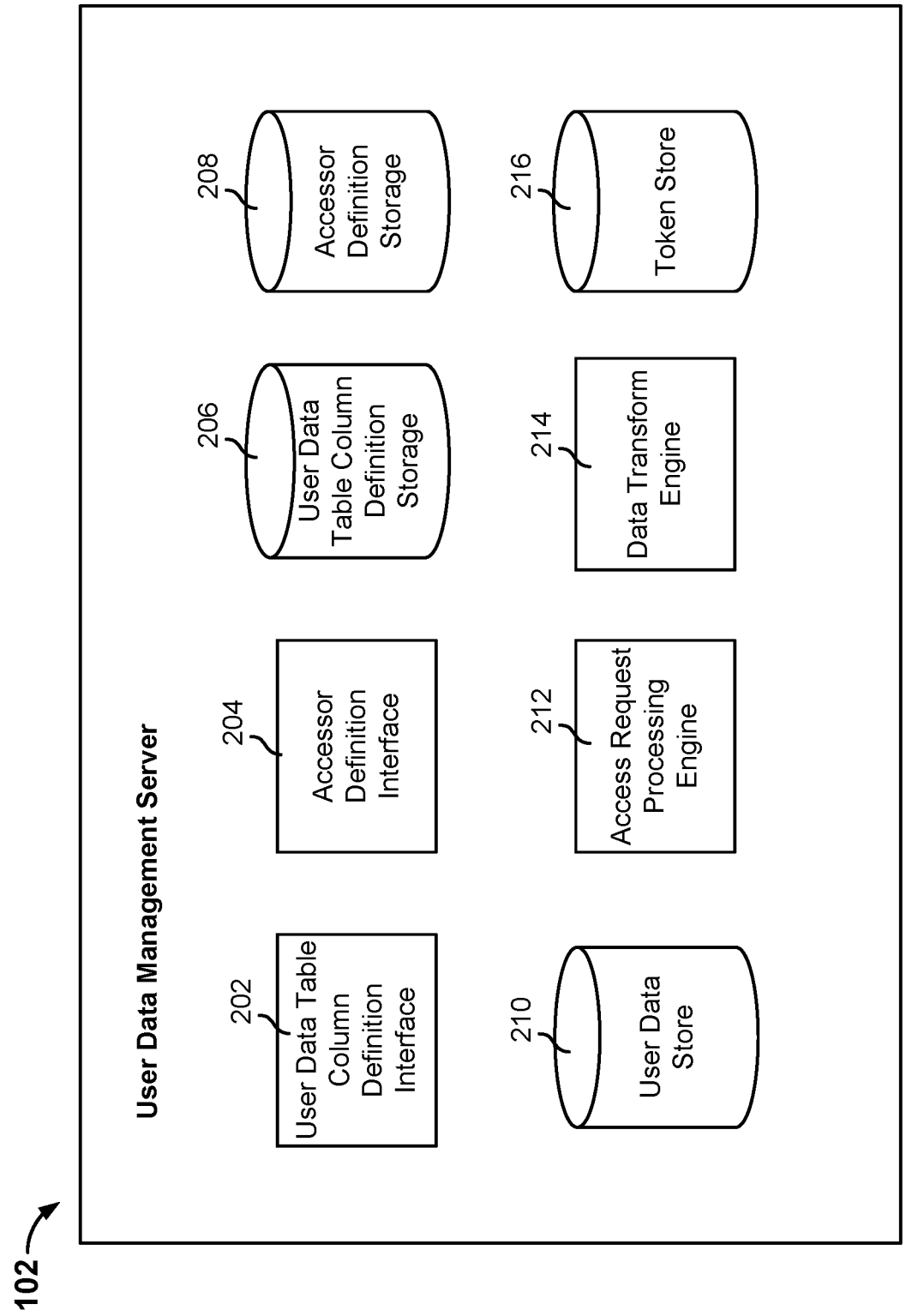
FIG. 2 is a diagram showing an example of a user data management server in accordance with some embodiments.

FIG. 2 is a diagram showing an example of a user data management server in accordance with some embodiments. In some embodiments, user data management server 102 of FIG. 1 can be implemented using the example of FIG. 2. In the example of FIG. 2, the user data management server comprises user data column definition interface 202, accessor definition interface 204, user data table column definition storage 206, accessor definition storage 208, user data store 210, access request processing engine 212, data transform engine 214, and token store 216. Each of user data table column definition interface 202, accessor definition interface 204, user data table column definition storage 206, accessor definition storage 208, user data store 210, access request processing engine 212, data transform engine 214, and token store 216 can be implemented using one or more both of hardware and software.

User data table column definition interface 202 is configured to receive submissions (e.g., from customers) of column definitions for the customers' respective user data tables. In various embodiments, the customers' respective user data tables are stored at user data store 210. In a first example, user data table column definition interface 202 comprises a user interface that can be presented at a website. In a second example, user data table column definition interface 202 comprises an API for receiving column definitions. In a third example, user data table column definition interface 202 comprises an interface that is operable to receive a bulk upload of configuration file(s). In general, the column definitions of a customer's user data table can be customized to describe what columns are going to be in the user data table and how the user data will be stored. In some embodiments, user data table column definition interface 202 is configured to provide a configuration file to a customer to enable the customer to configure a set of column definitions including one or more of the following: which columns are present in the customer's user data table, what type of user data each column should contain, where (e.g., a geographical location) the user data of each column should be stored, how the user data of each column should be encrypted, how the user data of each column relates to other columns, and policies that should apply to all accesses to the user data stored at each column. In some embodiments, user data table column definition interface 202 is configured to provide another configuration file to enable the customer to describe how the servers should be configured, backup policies, caching policies, global custom types, and policies, etc., to achieve desired performance and reliability needs.

Accessor definition interface 204 is configured to receive submissions (e.g., from customers) of definitions of accessors to perform create, read, update, and delete (CRUD) types of operations on the customers' user data stored at respective user data tables. In some embodiments, accessor definition interface 204 is configured to receive submissions (e.g., from customers) of definitions of logic and one or more integration accessor definitions to be associated with one or more adapters to be used by third-party services. For example, an adapter uses accessor definitions that are associated with CRUD operations but also include extra logic and configuration for common workflows. In various embodiments, the customers' respective user data tables are stored at user data store 210. In a first example, accessor definition interface 204 comprises a user interface that can be presented at a website. In a second example, accessor definition interface 204 comprises an API for receiving column definitions. In a third example, accessor definition interface 204 comprises an interface that is operable to receive a bulk upload of a configuration file. In some embodiments, accessor definition interface 204 is configured to provide a configuration file to a customer to enable the customer to configure a variety of accessor definitions and/or adapters, each of which includes one or more of the following: a name of the API, the column name to which the API applies, one operation among the CRUD types, whether the API is to apply online or offline, an access policy (including the roles that are permitted to access the API and the uses that are permitted by the API), whether read user data is to be transformed, and whether the user data is to be validated.

After a column definition is received at user data table column definition interface 202 or an accessor definition is received at accessor definition interface 204, a change to the definitions may be subsequently received. However, each change is subject to the same approval flow and is recorded for audit purposes. Not all configuration changes are reversible without data loss so testing configuration changes in the development environment prior to production deployment is best practice.

User data table column definition storage 206 is configured to store user data table column definitions that were received at user data table column definition interface 202. In some embodiments, user data table column definition storage 206 is also configured to store predetermined column definitions, which were configured by the service that operates the user data management server.

Accessor definition storage 208 is configured to store accessor definitions and adapter logic/configurations that were received at accessor definition interface 204. In some embodiments, accessor definition storage 208 is also configured to store predetermined accessor definitions and adapter logic/configurations, which were configured by the service that operates the user data management server.

User data store 210 is configured to store user data tables corresponding to one or more customers. As mentioned above, a user data table corresponding to a particular customer includes columns that are each defined by a corresponding column definition that is stored at user data table column definition storage 206. How user data is stored (created) in, updated at, read from, or deleted from a customer's user data table in user data store 210 is governed by one or both of that customer's column definitions (e.g., stored at user data table column definition storage 206) and the customer's accessor definitions (e.g., stored at accessor definition storage 208). In some embodiments, user data store 210 comprises a centralized storage. For example, the centralized storage is physically proximate to other components of the user data management server or the centralized user data store 210 can be located remote to the user data management server (e.g., such as hosted by a third-party cloud storage). In some embodiments, user data store 210 comprises a distributed storage such that different instances of user data store 210 are physically located in different geographical locations (e.g., different countries and/or different cities within a country). The laws of a particular country may require for user data associated with a customer to be stored in a particular physical country and as such, the instance of a distributed user data store 210 that is located in that country can be selected to store the user data to meet legal compliance.

Access request processing engine 212 is configured to handle requests to create, read, update, and/or store user data with respect to user data tables. Specifically, access request processing engine 212 is configured to receive requests that each specify at least a requested use of specified user data and a requested one of the CRUD operation types to perform with respect to the user data. For example, a request comprises a call that invokes an API for which an accessor definition is stored at accessor definition storage 208. As will be described in further detail below, access request processing engine 212 is configured to first obtain the relevant accessor definition for each request and then determine whether the request should be granted given the specified use and the access policy of the accessor definition. In the event that access request processing engine 212 determines that a request is to be granted, access request processing engine 212 proceeds to perform the requested operation with the specified user data at a corresponding location based on the column definitions and/or in a particular manner that is described by the relevant accessor definition. In a first example, where the requested operation is to create/store user data and user data store 210 is distributed, in some embodiments, access request processing engine 212 is configured to select a particular instance of user data store 210 at which to store the user data associated with the request based on a geographic distribution policy that is described in the column definitions. In a second example, where the requested operation is to create/store user data and the column definitions described a federation policy, then access request processing engine 212 is configured to store the user data associated with the request at a client device rather than user data store 210. In a third example, where the requested operation is to read previously stored user data and the relevant accessor definition describes to transform the retrieved user data, access request processing engine 212 is configured to send the retrieved user data to data transform engine 214 for data transform engine 214 to transform the user data in accordance with the data transformation type that is specified in the relevant accessor definition.

Data transform engine 214 is configured to receive user data (e.g., that is read by access request processing engine 212 from user data store 210) associated with a request and then transform the user data by a data transformation type that is specified in the accessor definition that is relevant to the request. As will be described in further detail below, a first type of data transformation is to randomize user data, a second type of data transformation is to derive a value from the user data, and a third type of data transformation is to replace the user data with a non-sensitive token. In some embodiments, to transform user data into a token is performed by data transform engine 214 based on a token generation policy associated with the user data (e.g., and is referenced in the relevant accessor definition). The token generation policy can be configured to prescribe how the resulting token should appear for a given input data. Data transform engine 214 is further configured to store an entry that includes a mapping of the user data and the token in token store 216, which could be either a centralized or distributed storage (with different instances located in different geographical locations). After performing the data transformation, data transform engine 214 is configured to send the resulting transformed data (e.g., randomized data, derived data, or a token) to a requested destination. Where the transformed data comprises a token, the recipient of the token can send a token resolution request to data transform engine 214 to access the user data backing the token. Whether the token resolution request is to be granted will be determined by data transform engine 214 based on a token resolution policy that has been associated with that token, as will be described in further detail below.

Figure 3:
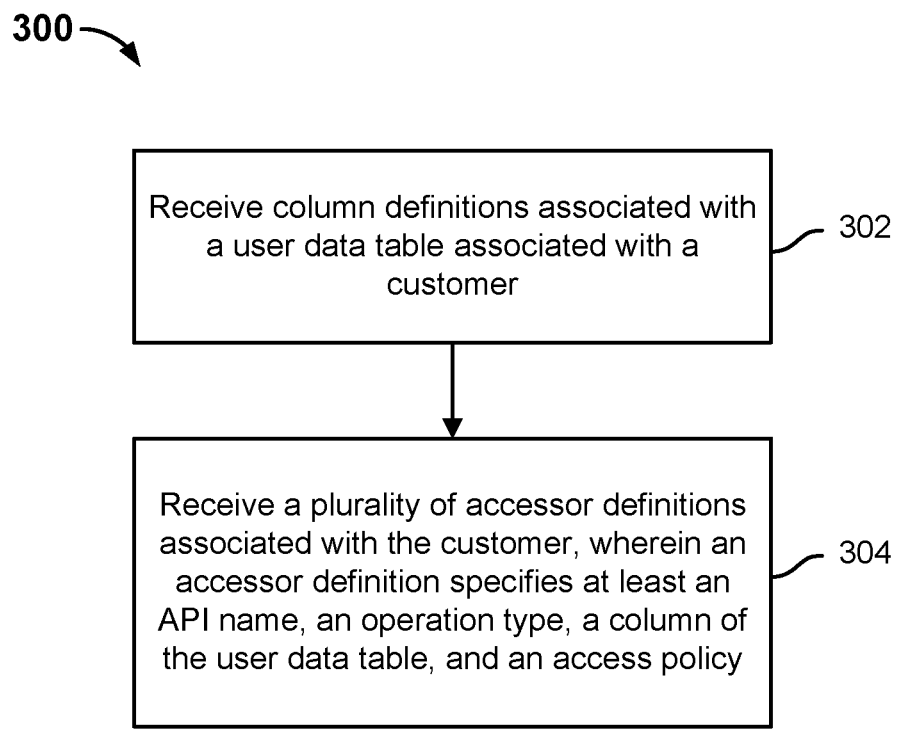
FIG. 3 is a flow diagram showing an example of a process for receiving configurations of column definitions and accessor definitions associated with a customer in accordance with some embodiments.

FIG. 3 is a flow diagram showing an example of a process for receiving configurations of column definitions and accessor definitions associated with a customer in accordance with some embodiments. In some embodiments, process 300 is implemented at user data management server 102 of FIG. 1.

As mentioned above, column definitions and accessor definitions can be received via a user interface, an API, or an interface for bulk uploads of configuration files.

At 302, column definitions associated with a user data table associated with a customer are received. In some embodiments, column definitions that describe a user data table that is to store user data for a particular customer include properties/configuration fields that are separately defined for each column in the table.

The following are example properties/configuration fields that can be defined/customized in the column definitions for each column in the user data table:

Name—The name of the column. The column name is required to be distinct from the names of other columns in the same user data table.

Primitive Data Type—The type of data stored in the column. Examples of the primitive data type include string, number, etc.

Logical Data Type—The type of data represented by the column. Examples of the logical data type include "First Name," "Phone Number," "Address," "Email," etc. Either is predefined types can be used or new types can be declared. In some embodiments, if a predefined type is selected, then data validation corresponding to that logical data type can be applied on user data that requested to be stored at the column.

Purpose—A reference to the purpose/use for which data was collected. Either predefined purposes can be selected or new purposes can be declared. Examples of purposes include integrity, analytics, marketing, operations, and product improvements. In some embodiments, each purpose can also map to a corresponding privacy policy (e.g., a legal document or terms of service).

Geographic distribution policy [optional]—The optional geographic distribution policy configuration field describes where the user data in the column should be stored. For example, the geographic distribution policy can specify whether the user data in the column should be stored in data centers in the end users' country/region, if the user data in the column should be cached centrally, and how the cache should expire. By default, the columns are all stored in the same data center in the region that is selected.

Encryption Policy [optional]—The optional encryption policy describes if the user data in the column should be encrypted by a provided key such as, for example, by a key stored in another column (e.g., in the same user data table). By default, all columns are encrypted at rest by a per application key.

Federation Policy [optional]—The optional federation policy describes if the user data stored in the column should be stored on the end user's device, the type of authentication action required to read the data (such as explicit user approval, for example), the duration of approved session, and the caching policy.

Global Access Policy [optional]—The optional global access policy describes a global access policy that should apply to every access request to the user data stored in the column. This policy will be applied before the access policy that is included in the individual accessor definition (e.g., a CRUD API) that is invoked by an access request. The global access policy can add another layer of protection to access of the column on top of what is provided in is the access policy that is provided in an accessor definition that is relevant to an access request.

In some embodiments, the columns are limited in size and are not meant for storing bulk data. Instead, in some embodiments, metadata, encryption keys, and reference to the bulk data should be stored in another store. For example, a data store is limited to 200 columns.

In some embodiments, the column definitions corresponding to a user data table include a set of predefined columns that cannot be deleted. Examples of such predefined columns include one or more of the following:

UserID—This column contains a GUID representing a user identifier (ID) that is issued by the user data management server on account creation. This column's value cannot be changed except through user account merge APIs that allow for combinations of two accounts or through user account deletion API.

Created Time—This column indicates the time at which a user data value in the column was created.

Deleted Time—This column indicates the time at which a user data value in the column was deleted.

Updated Time—This column indicates the time at which a user data value in the column was updated.

At 304, a plurality of accessor definitions associated with the customer is received, wherein an accessor definition specifies at least an API name, an operation type, a column of the user data table, and an access policy. In some embodiments, accessor definitions that describe how user data stored in a user data table can be created, read, updated, and/or deleted are separately defined for each combination of operation type, affected column, and access policy. For example, there could be multiple READ APIs defined for performing different types of read on the same column of user data. Also, for example, the mapping between CRUD APIs to a single column in the user data table could be many to one. As a result, hundreds of thousands of accessor definitions can be defined by a particular customer.

The following are example properties/configuration fields that can be defined/customized in each particular accessor definition (e.g., CRUD API) associated with a customer:

Name—The name of the API. This API name is required to be distinct per user data table.

Column Name—The name of the column of the user data table on which this API operates. Where the bulk data export API is used to submit the accessor definition, the names of the columns on which this API operates can be specified as an array (e.g., Data Array [0, . . . , N]).

Operation—One of the following types of operations: CREATE, READ, UPDATE, DELETE, and RESOLVETOKEN.

Type—ONLINE/OFFLINE. An "online" API is one that only permits access when the end user's client application is running (e.g., the access is initiated due to the action of the end user). An "offline" API is one that only permits access when the end user's client application is not running (e.g., the access is initiated due to the action of the customer server). Whether the end user's client application is an "online" or "offline" state is maintained by the customer server can be passed in as an argument the access request.

Access Policy—The access policy includes at least two parts. A first part of the access policy is the authorization policy, which describes who (e.g., which roles) should be allowed to access this API. For example, a requestor that comprises a role of a security engineer or a role of the end user herself can be permitted to access the end user's data stored in the column. However, in another, a requestor that comprises a role of a non-security engineer should not be permitted to access the end user's data stored in the column. A second part of the access policy is allowed/permitted purposes or uses for which accesses to the user data in the column are permitted via the API. Examples of allowed purposes or uses include integrity, analytics, marketing, operations, product improvements, or customer support.

Data Transform—This configuration field is only available for READ operations. This policy describes how the data should be transformed prior to return. For example, the requested user data can be returned as-is, tokenized, made less precise by randomizing by a shift amount, made partial, or returned as another type of derivation of the user data. By default, the requested user data is returned as-is. In some embodiments, the data transform configuration field can also specify whether to send the transformed data to the original requestor or a third-party.

Data Validation Policy—This configuration field is only available for CREATE/UPDATE operations. This policy describes how the data should be validated before being accepted. By default, the user data is verified to match the format of the primitive data type and logical data type that were specified for the column in the column definitions. For example, the data validation policy could ensure that all phone numbers are written in the (xxx) xxx-xxxx format.

Approval Policy [optional]—The optional approval policy describes if access requires out of phase approval (e.g., a multi-factor authentication) or special audit logging.

Product Boundary [optional]—The optional product boundary configuration field is a set of tags describing from which parts of the application this API can be called. It is used together with a client SDK to maintain data use boundaries within applications that combine multiple user facing products (e.g., such as a marketplace and ads product) or data pipelines that serve those products. For example, the product boundary field may include a permitted path in an access request that can lead to access of this API.

Documentation Reference [optional]—The optional documentation includes a reference to an internal document/ artifact from the process used to approve this use of user data.

In some embodiments, the integration accessor definitions and corresponding logic/configurations of adapters can also be received at step 304.

Figure 4:
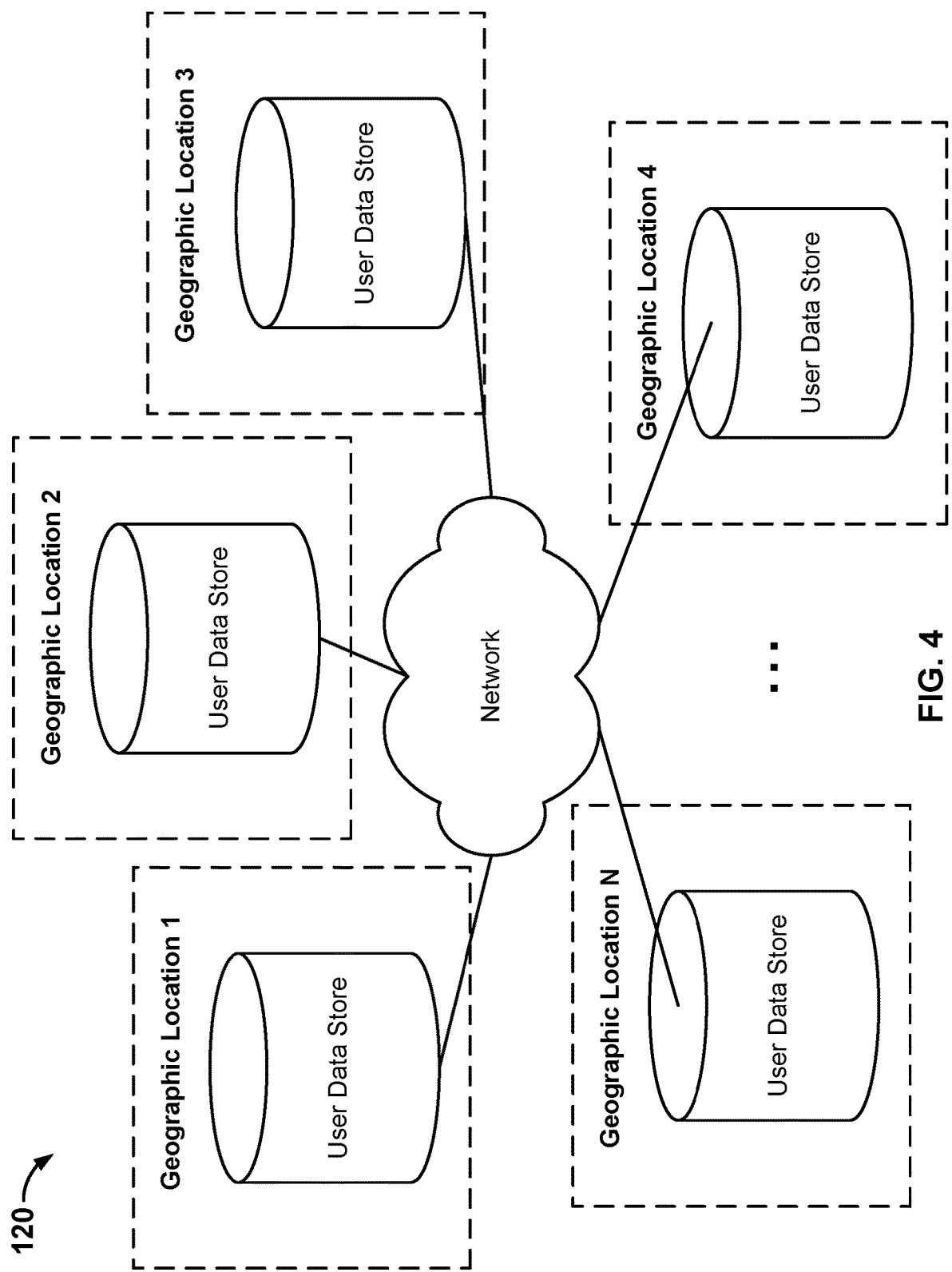
FIG. 4 is a diagram showing an example of a distributed user data store in accordance with some embodiments.

FIG. 4 is a diagram showing an example of a distributed user data store in accordance with some embodiments. In some embodiments, user data store 120 of FIG. 1 can be implemented using the example of a distributed user data store that is shown in FIG. 4. As shown in FIG. 4, the distributed user data store comprises N number of instances of user data stores that are located in different physical geographic locations and connected by a network, where N is a value greater than zero. For example, the N geographic locations could be spread across different countries and/or across different cities in one or more countries. One advantage to using a distributed user data store is that requests for user data may originate in different geographic locations and those requests could be processed faster if the relevant user data could be handled at a proximate instance of the user data store. Another advantage to using a distributed user data store is that different jurisdictions may have different legal requirements on where user data should be stored and the user data management server can select a particular geographic location in which to store the user data (e.g., based on the column definitions of the relevant user data table). As such, a distributed user data store such as the example shown in FIG. 4 provides efficient and flexible storage options for user data.

Figure 5:
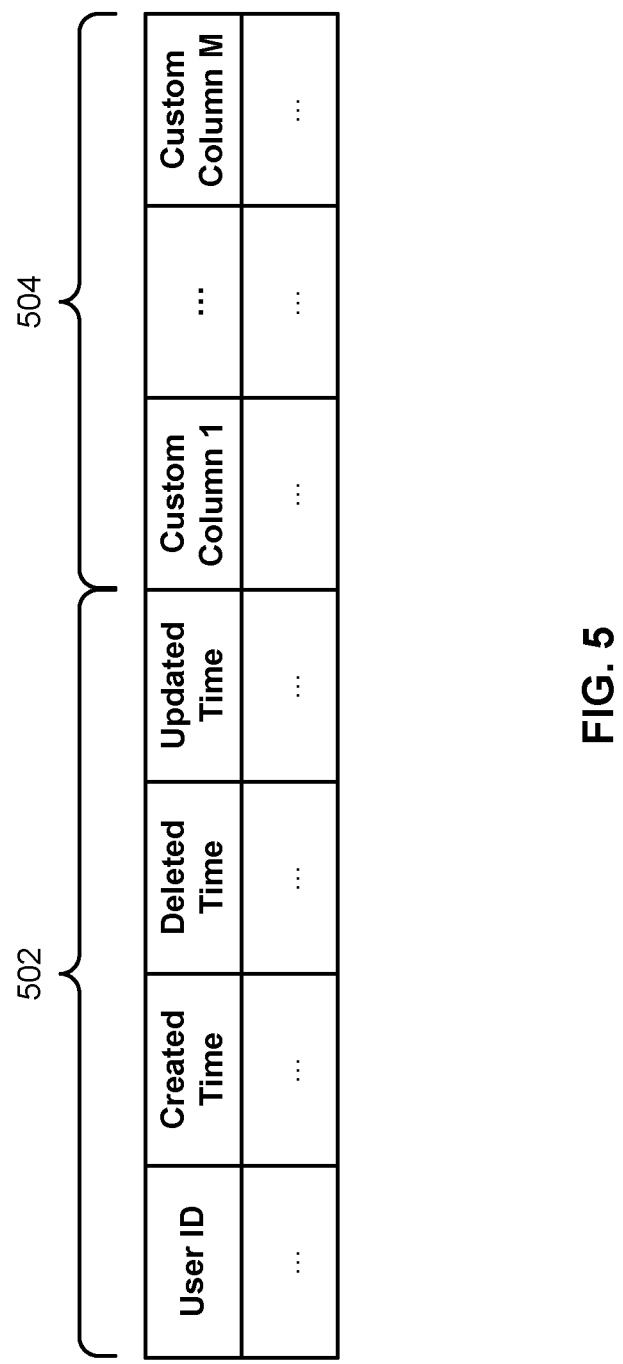
FIG. 5 is a diagram showing an example user data table as described by a corresponding set of column definitions in accordance with some embodiments.

FIG. 5 is a diagram showing an example user data table as described by a corresponding set of column definitions in accordance with some embodiments. As shown in the example, the user data table includes set of predefined columns 502 (User ID, Created Time, Deleted Time, Updated Time) and set of custom columns 504. While set of predefined columns 502 are included in the user data table, the properties/configuration fields of each column of set of custom columns 504 are configured (e.g., by a customer) in a corresponding set of column definitions. Set of custom columns 504 includes M columns, where M is a value that is one or greater. In some embodiments, the column definitions of the user data table can be modified to add new columns or remove an existing column. User data can be requested to be stored/created in, read from, updated at, and/or deleted from the user data table of FIG. 5 via use-specific access requests (e.g., API calls) that invoke accessor definitions associated with the customer, as will be described in further detail below.

Figure 6:
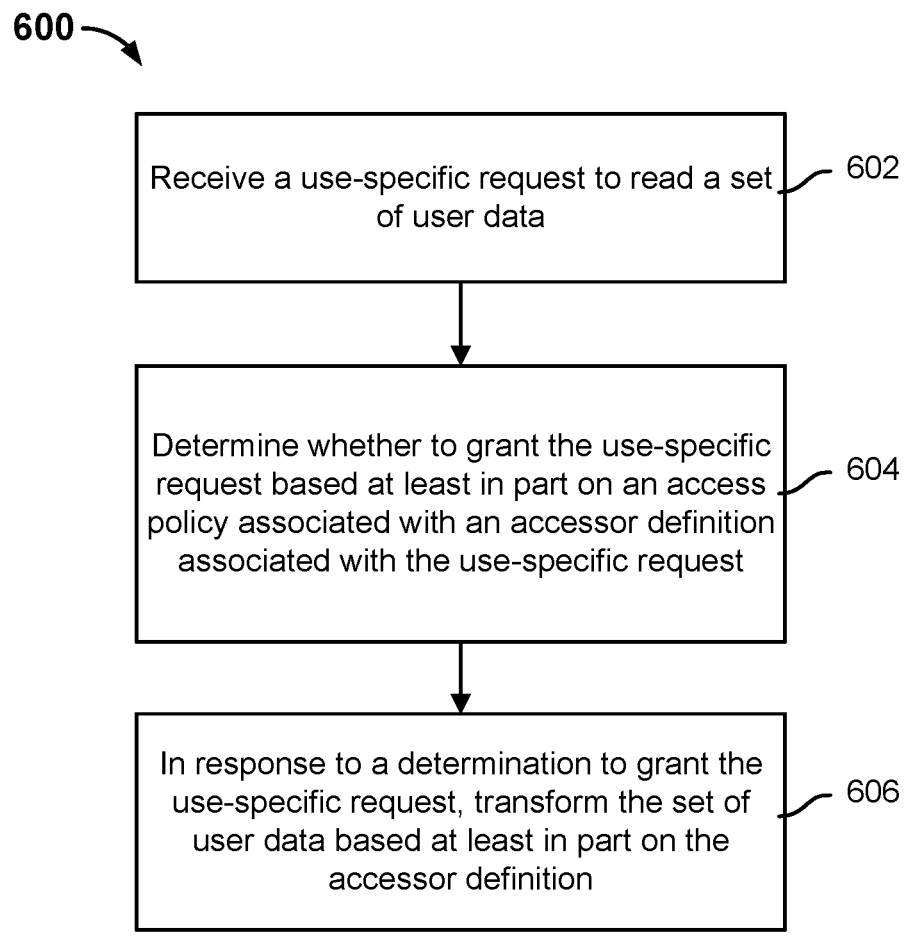
FIG. 6 is a flow diagram showing an embodiment of a process for handling a use-specific request to read user data.

FIG. 6 is a flow diagram showing an embodiment of a process for handling a use-specific request to read user data. In some embodiments, process 600 is implemented at user data management server 102 of FIG. 1.

At 602, a use-specific request to read a set of user data is received. The request to read user data comprises an invocation of an API for which an accessor definition was previously obtained. For example, the invocation comprises Invoke(API Name, Arguments . . . ) and where "API Name" identifies a previously defined API for reading user data. One of the arguments that is passed in the invocation/request is a specified use/purpose for the requested user data.

At 604, whether to grant the use-specific request is determined based at least in part on an access policy associated with an accessor definition associated with the use-specific request. The accessor definition that is identified by the, for example, "API Name," that is included in the request is retrieved from storage. As described above, each accessor definition comprises an access policy, which describes the roles of requestors that are authorized to access the API and also the allowed uses/purposes of the requested user data. For example, a role associated with the requestor can be determined, for example, based on the identity of the requestor that is associated with the read request. The identity can then be used to determine a relevant role or set of permissions associated with the requestor. As such, to determine whether the read request should be granted, at least the role of the requestor is compared to the set of authorized roles in the access policy and the specified use associated with the allowed uses/purposes in the access policy. The read request is granted based at least on the requestor's role matching a role that is authorized for accessing the API and the specified use of the request matching an allowed use of the API.

At 606, in response to a determination to grant the use-specific request, the set of user data is transformed based at least in part on the accessor definition. In the event that the read request is to be granted, the requested user data is located from the user data store (e.g., at a particular instance that is determined based on the geographic distribution policy of the corresponding column in the column definitions) or from an end user's client device (e.g., if the column definitions indicated a federation policy for the column from which user data is requested). In the event that the relevant accessor definition provides a data transform to be associated with the column at which the requested user data is stored, then the located user data is first read and then transformed in accordance with the specified data transformation type (e.g., randomization, derivation, or tokenization). The transformed user data then is either returned to the requestor or passed on to a third-party destination, depending on the destination specified in the read request.

Figure 7:
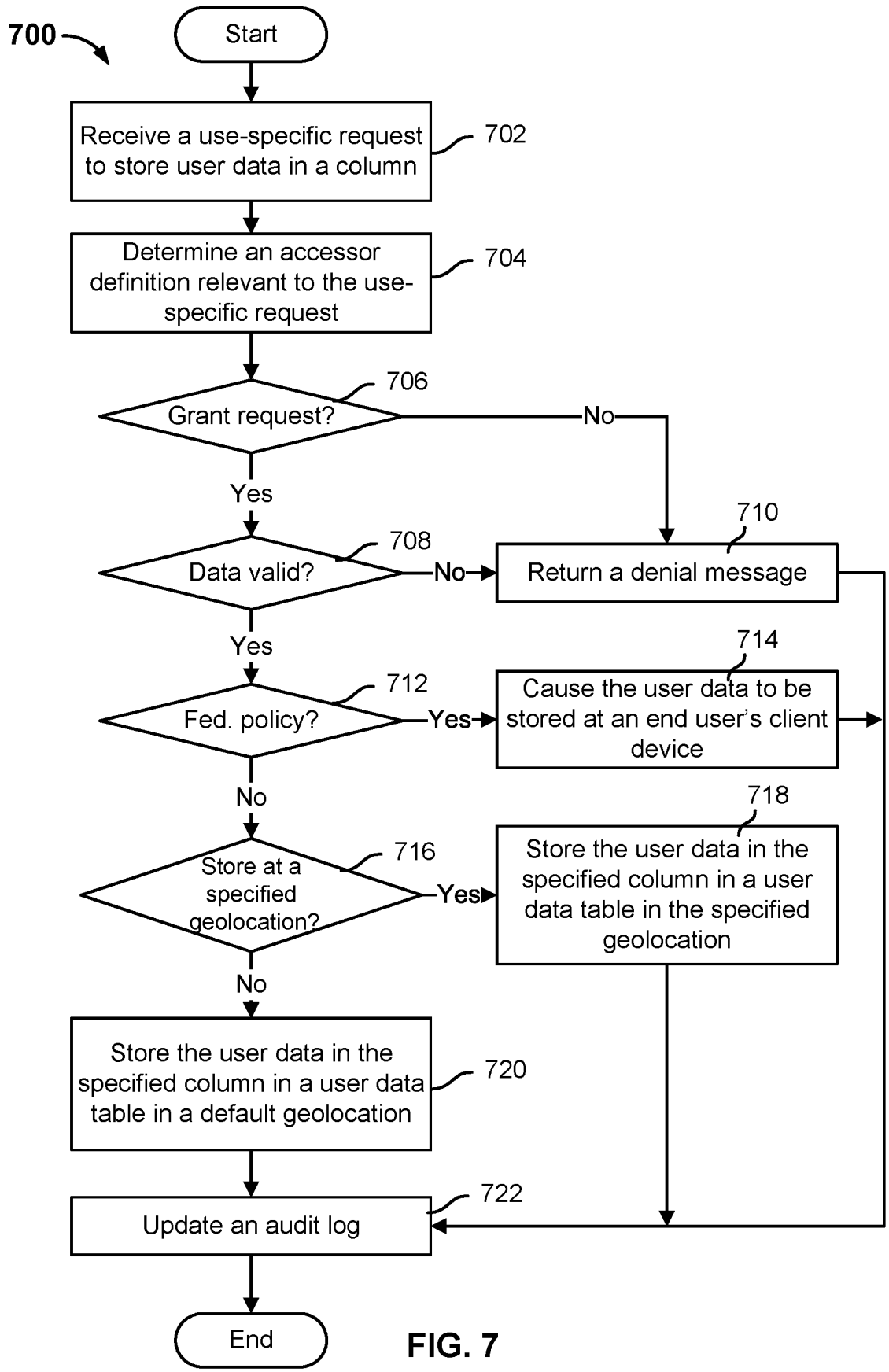
FIG. 7 is a flow diagram showing an example of a process for handling a use-specific request to store user data in accordance with some embodiments.

FIG. 7 is a flow diagram showing an example of a process for handling a use-specific request to store user data in accordance with some embodiments. In some embodiments, process 700 is implemented at user data management server 102 of FIG. 1.

At 702, a use-specific request to store user data in a column is received. The request comprises an invocation of a specified API for storing (creating) user data, the user data that is to be stored in a particular column in a user data table, and a specified use/purpose.

At 704, an accessor definition relevant to the use-specific request is determined. The accessor (API) definition corresponding to the specified create API is retrieved from storage. The column of a user data table to which the user data is requested to be stored is specified in the ("column name" configuration field of the) relevant accessor definition.

At 706, whether the use-specific request to store user data is granted is determined. In the event that the use-specific request to store user data is granted, control is transferred to 708. Otherwise, in the event that the use-specific request to store user data is denied, control is transferred to 710. In various embodiments, whether the use-specific request to store user data is granted is determined based at least in part on an access policy that is referenced by the accessor definition that is relevant to the API specified by the request. The relevant accessor definition (a create API definition) includes an access policy that describes the roles that are authorized to access the API and also a set of permitted uses of the API. A role is determined for the requestor based on a requestor identity that is determined from the request and is compared to the authorized roles in the accessor definition's access policy. The use that is specified in the request is also compared to the set of permitted uses in the accessor definition's access policy. In some embodiments, the request is granted only if both the role of the requestor matches an authorized role and the specified use matches a permitted use.

In some embodiments, in addition to the access policy of the accessor definition, the global access policy, if one has been set by the column definitions for the column that is specified in the relevant accessor definition, is also evaluated against the arguments/requestor roles of the request to confirm that the request can be granted.

In some embodiments, in addition to the access policy of the accessor definition, an out-of-phase approval (e.g., a verification prompt is sent to the device of an administrator user of the customer to receive approval of the request) is executed in accordance with the approval policy, if one has been set in the relevant accessor definition, before the request can be granted.

At 708, whether the user data associated with the use-specific request is valid is determined. In the event that the user data is valid, control is transferred to 712. Otherwise, in the event that the user data is not valid, control is transferred to 710. The user data of the create request is validated based on the data validation policy that is described in the relevant accessor definition to ensure that the user data associated with the request matches the format of the primitive data type and logical data type of the specified column of the create API definition.

At 710, a denial message is returned. Where the request is not determined to be granted and/or the user data of the request cannot be validated, a denial message is sent back to the requestor to indicate that the request cannot be completed.

At 712, whether the user data associated with the use-specific request is subject to a federation policy is determined. In the event that the user data associated with the use-specific request is subject to a federation policy, control is transferred to 714. Otherwise, in the event that the user data associated with the use-specific request is not subject to a federation policy, control is transferred to 716. In the event that the specified column is subject to a federation policy that has been defined for that column in the column definitions, then the user data associated with the request must be stored at a client device of the end user associated with that data. Otherwise, if no such federation policy has been configured for that specified column, then the user data associated with the request is to be stored at a user data store.

At 714, the user data is caused to be stored at an end user's client device.

At 716, whether the user data associated with the use-specific request is to be stored at a specified geolocation is determined. In the event that the user data associated with the use-specific request is to be stored at a specified geolocation, control is transferred to 718. Otherwise, in the event that the user data associated with the use-specific request is not to be stored at a specified geolocation, control is transferred to 720. In the event that the specified column is subject to a geographic distribution policy that has been defined for that column in the column definitions, then the user data must be stored in an instance of the user data store that is is located in the geolocation that is specified in the geographic distribution policy. Otherwise, the user data is stored at a user data store in a default geolocation (e.g., the location closest to the location from which the request had originated).

At 718, the user data is stored in the specified column in a user data table in the specified geolocation.

At 720, the user data is stored in the specified column in a user data table in a default geolocation.

At 722, an audit log is updated. The audit log is updated with information such as one or more of the following: information about the use-specific request (e.g., the invoked API, the arguments included therein), whether the request was granted, the policies that had applied to the request, and any special auditing features that are triggered by an applicable policy.

Figure 8:
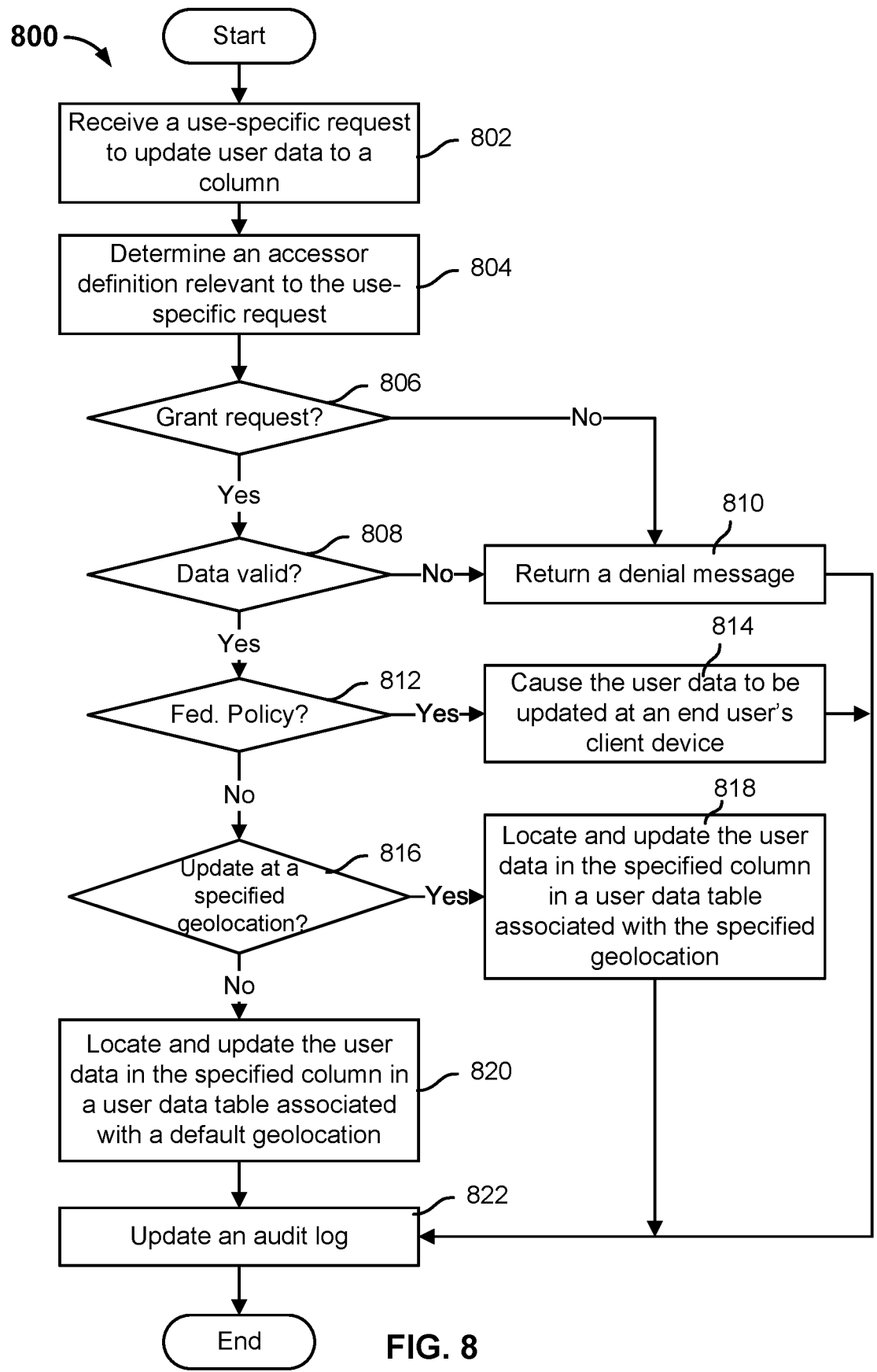
FIG. 8 is a flow diagram showing an example of a process for handling a use-specific request to update user data in accordance with some embodiments.

FIG. 8 is a flow diagram showing an example of a process for handling a use-specific request to update user data in accordance with some embodiments. In some embodiments, process 800 is implemented at user data management server 102 of FIG. 1.

At 802, a use-specific request to update user data in a column is received. The request comprises an invocation of a specified API for updating user data, the updated user data that is to be stored in a particular column in a user data table, and a specified use/purpose.

At 804, an accessor definition relevant to the use-specific request is determined. The accessor (API) definition corresponding to the specified update API is retrieved from storage. The column of a user data table to which the user data is requested to be stored is specified in the ("column name" configuration field of the) relevant accessor definition.

At 806, whether the use-specific request to update user data is granted is determined. In the event that the use-specific request to update user data is granted, control is transferred to 808. Otherwise, in the event that the use-specific request to update user data is denied, control is transferred to 810. In various embodiments, whether the use-specific request to update user data is granted is determined based at least in part on an access policy that is referenced by the accessor definition that is relevant to the API specified by the request. The relevant accessor definition (a update API definition) includes an access policy that describes the roles that are authorized to access the API and also a set of permitted uses of the API. A role is determined for the requestor based on a requestor identity that is determined from the request and is compared to the authorized roles in the accessor definition's access policy. The use that is specified in the request is also compared to the set of permitted uses in the accessor definition's access policy. In some embodiments, the request is granted only if both the role of the requestor matches an authorized role and the specified use matches a permitted use.

In some embodiments, in addition to the access policy of the accessor definition, the global access policy, if one has been set by the column definitions for the column that is specified in the relevant accessor definition, is also evaluated against the arguments/requestor roles of the request to confirm that the request can be granted.

In some embodiments, in addition to the access policy of the accessor definition, an out-of-phase approval (e.g., a verification prompt is sent to the device of an administrator user of the customer to receive approval of the request) is executed in accordance with the approval policy, if one has been set in the relevant accessor definition, before the request can be granted.

At 808, whether the user data associated with the use-specific request is valid is determined. In the event that the user data is valid, control is transferred to 812. Otherwise, in the event that the user data is not valid, control is transferred to 810. The user data of the update request is validated based on the data validation policy that is described in the relevant accessor definition to ensure that the user data associated with the request matches the format of the primitive data type and logical data type of the specified column of the create API definition.

At 810, a denial message is returned. Where the request is not determined to be granted and/or the user data of the request cannot be validated, a denial message is sent back to the requestor to indicate that the request cannot be completed.

At 812, whether the user data associated with the use-specific request is subject to a federation policy is determined. In the event that the user data associated with the use-specific request is subject to a federation policy, control is transferred to 814. Otherwise, in the event that the user data associated with the use-specific request is not subject to a federation policy, control is transferred to 816. In the event that the specified column is subject to a federation is policy that has been defined for that column in the column definitions, then the user data associated with the request must be updated at a client device of the end user associated with that data. Otherwise, if no such federation policy has been configured for that specified column, then the user data associated with the request is to be stored at a user data store.

At 814, the user data is caused to be updated at an end user's client device.

At 816, whether the user data associated with the use-specific request is to be updated at a specified geolocation is determined. In the event that the user data associated with the use-specific request is to be updated at a specified geolocation, control is transferred to 818. Otherwise, in the event that the user data associated with the use-specific request is not to be updated at a specified geolocation, control is transferred to 820. In the event that the specified column is subject to a geographic distribution policy that has been defined for that column in the column definitions, then the user data must be updated in an instance of the user data store that is located in the geolocation that is specified in the geographic distribution policy. Otherwise, the user data is updated at a user data store in a default geolocation (e.g., the location closest to the location from which the request had originated).

At 818, the user data is located and updated in the specified column in a user data table in the specified geolocation. The previously stored user data at the specified column is updated based on the updated user data of the request.

At 820, the user data is located and updated in the specified column in a user data table in a default geolocation. The previously stored user data at the specified column is updated based on the updated user data of the request.

At 822, an audit log is updated. The audit log is updated with information such as one or more of the following: information about the use-specific request (e.g., the invoked API, the arguments included therein), whether the request was granted, the policies that had applied to the request, and any special auditing features that are triggered by an applicable policy.

Figure 9:
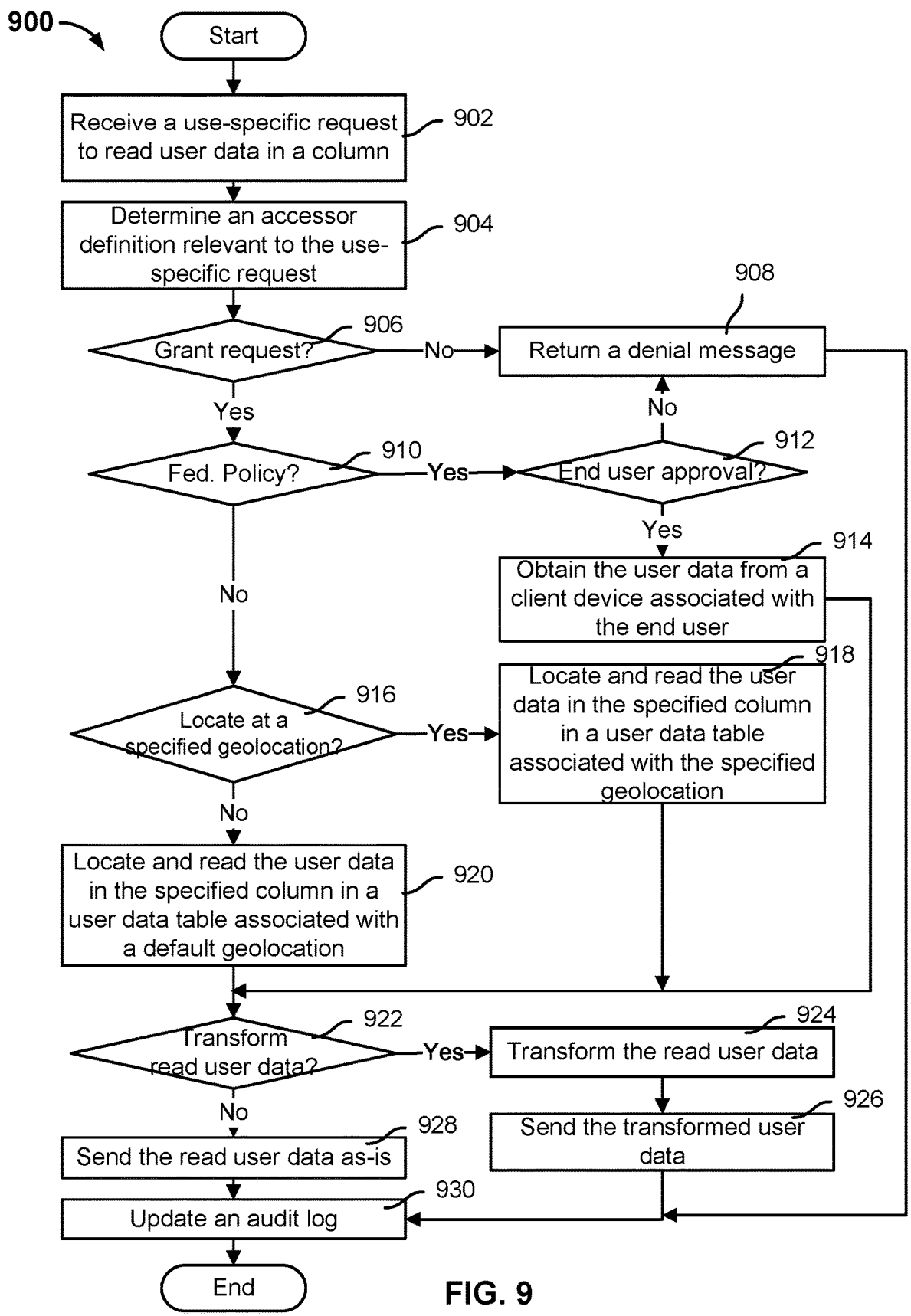
FIG. 9 is a flow diagram showing an example of a process for handling a use-specific request to read user data in accordance with some embodiments.

FIG. 9 is a flow diagram showing an example of a process for handling a use-specific request to read user data in accordance with some embodiments. In some embodiments, process 900 is implemented at user data management server 102 of FIG. 1. In some embodiments, process 600 of FIG. 6 can be implemented using process 900.

At 902, a use-specific request to read user data in a column is received. The request comprises an invocation of a specified API for reading user data and a specified use/purpose.

At 904, an accessor definition relevant to the use-specific request is determined. The accessor (API) definition corresponding to the specified read API is retrieved from storage. The column of a user data table from which the user data is requested to be read is specified in the ("column name" configuration field of the) relevant accessor definition.

At 906, whether the use-specific request to read user data is granted is determined. In the event that the use-specific request to read user data is granted, control is transferred to 910. Otherwise, in the event that the use-specific request to read user data is denied, control is transferred to 908. In various embodiments, whether the use-specific request to read user data is granted is determined based at least in part on an access policy that is referenced by the accessor definition that is relevant to the API specified by the request. The relevant accessor definition (a read API definition) includes an access policy that describes the roles that are authorized to access the API and also a set of permitted uses of the API. A role is determined for the requestor based on a requestor identity that is determined from the request and is compared to the authorized roles in the accessor definition's access policy. The use that is specified in the request is also compared to the set of permitted uses in the accessor definition's access policy. In some embodiments, the request is granted only if both the role of the requestor matches an authorized role and the specified use matches a permitted use.

In some embodiments, in addition to the access policy of the accessor definition, the global access policy, if one has been set by the column definitions for the column that is specified in the relevant accessor definition, is also evaluated against the arguments/requestor roles of the request to confirm that the request can be granted.

In some embodiments, in addition to the access policy of the accessor definition, an out-of-phase approval (e.g., a verification prompt is sent to the device of an administrator user of the customer to receive approval of the request) is executed in accordance with the approval policy, if one has been set in the relevant accessor definition, before the request can be granted.

At 908, a denial message is returned. Where the request is not determined to be granted, a denial message is sent back to the requestor to indicate that the request cannot be completed.

At 910, whether the user data associated with the use-specific request is subject to a federation policy is determined. In the event that the user data associated with the use-specific request is subject to a federation policy, control is transferred to 912. Otherwise, in the event that the user data associated with the use-specific request is not subject to a federation policy, control is transferred to 916. In the event that the specified column is subject to a federation policy that has been defined for that column in the column definitions, then the user data associated with the request is to be read from a client device of the end user associated with that data. Otherwise, if no such federation policy has been configured for that specified column, then the user data associated with the request is to be read from a user data store.

At 912, whether the end user provided approval for the read is determined. In the event that the end user had provided approval for the read, control is transferred to 914. Otherwise, in the event that the end user had not provided approval for the read, control is transferred to 908. Because the user data associated with the request is federated data that is stored at the end user's client device, the user data cannot be read within the end user's approval. As such, a prompt for reading the user data is sent to the end user's client device and the end user can either approve or reject the request.

At 914, the user data is caused to be obtained from an end user's client device. In the event that the end user has approved of the request, the user data is read from the user's client device.

At 916, whether the user data associated with the use-specific request is to be located from a specified geolocation is determined. In the event that the user data associated with the use-specific request is to be located from a specified geolocation, control is transferred to 918. Otherwise, in the event that the user data associated with the use-specific request is not to be located from a specified geolocation, control is transferred to 920. In the event that the specified column is subject to a geographic distribution policy that has been defined for that column in the column definitions, then the user data must be read from an instance of the user data store that is located in the geolocation that is specified in the geographic distribution policy. Otherwise, the user data is read from a user data store in a default geolocation (e.g., the location closest to the location from which the request had originated).

At 918, the user data is located and read from the specified column in a user data table in the specified geolocation.

At 920, the user data is located and read from the specified column in a user data table in a default geolocation.

At 922, whether the read user data is to be transformed is determined. In the event that the read user is to be transformed, control is transferred to 924. Otherwise, in the event that the read user is not to be transformed, control is transferred to 928. Data transforms are a powerful mechanism that limits the data accessed to only what is needed for a scenario and therefore, improves overall data security.

In the event that the specified column is subject to a data transform policy that has been defined for that column in the column definitions, then the read user data must be transformed according to a transformation type that is specified in the data transform policy before being returned to the requestor or sent to a third-party destination. Otherwise, the as-is read user data is returned to the requestor or sent to a third-party destination. Examples of different types of data transformation (tokenization, randomization, and derivation) are described below in FIGS. 10, 12, and 13. Derivation and randomization may be appropriate when partial or imprecise data fully addresses the need of the application or workflow. Tokenization may be appropriate when precise data will be needed eventually but is not needed during transport, analysis, or storage of the data set.

At 924, the read user data is transformed. The read user data is transformed according to a transformation type that is specified in the data transform policy of the relevant accessor definition.

At 926, the transformed user data is sent. For example, the token, the randomized value, or the derived value is sent to the requestor or sent to a third-party destination. For example, whether the read data is to be returned to the requestor or sent to a third-party destination can be specified as an argument in the request.

At 928, the read user data is sent as-is.

At 930, an audit log is updated. The audit log is updated with information such as one or more of the following: information about the use-specific request (e.g., the invoked API, the arguments included therein), whether the request was granted, the policies that had applied to the request, and any special auditing features that are triggered by an applicable policy.

Figure 10:
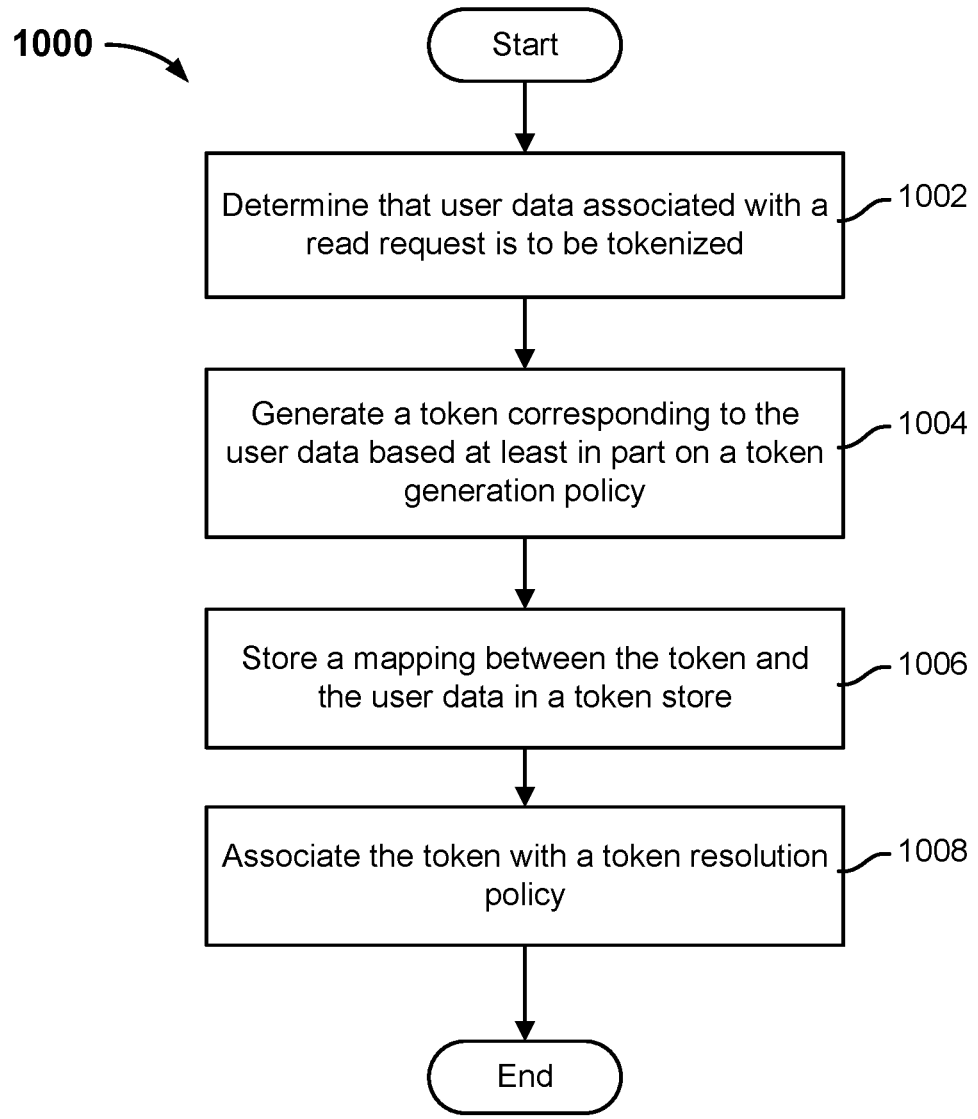
FIG. 10 is a flow diagram showing an example of a process for performing a tokenizing type of data transformation on read user data in accordance with some embodiments.

FIG. 10 is a flow diagram showing an example of a process for performing a tokenizing type of data transformation on read user data in accordance with some embodiments. In some embodiments, process 1000 is implemented at user data management server 102 of FIG. 1. In some embodiments, step 924 of process 900 of FIG. 9 can be implemented using process 1000.

At 1002, user data associated with a read request is determined to be tokenized. For example, the user data that is requested by a read request is transformed according to a transformation type that is specified in the data transform policy of the accessor definition that is relevant to the read request.

At 1004, a token corresponding to the user data is generated based at least in part on a token generation policy. In some embodiments, the token generation policy to use to generate a token based on the user data is referenced in the data transform policy. The token is generated in accordance with the token generation policy. The generated token may preserve the format of the set of user data or preserve at least a portion/component of the set of user data, depending on the parameters specified in the token generation policy. The generated token could also inject a human or computer readable/meaningful predetermined value, depending on the parameters specified in the token generation policy. In various embodiments, the set of user data cannot be recovered/derived from the token itself and the set of user data can only be recovered if a token resolution request that includes that token is granted. For example, the token that is generated based on email john.smith@gmail.com is xycljnwio@ahsntkjo.com, which according to the corresponding token generation policy, has preserved the email format of the user data.

At 1006, a mapping between the token and the user data is stored in a token store. An entry corresponding to the token is stored in a token store. An entry that includes at least a mapping between the set of user data and the token (e.g., both the token ID and the token value) is stored in a token store. In some embodiments, the entry may further include one or more of the following: identifying information associated with the token generation policy, identifying information associated with the token resolution policy (e.g., which is included in the token generation request or elsewhere), a creation time, a user ID (e.g., that is assigned by the tokenizer server), and a set of attributes associated with the user data (e.g., which are included in the token generation request). In some embodiments, if the token store is distributed, then the entry can be stored in an instance of the token store that is located in a selected physical location. For example, the physical location can be selected based on a location identified in the token generation policy. In another example, the physical location can be selected based on its proximity to the location from which the token generation request was received. If an explicit expiration time is not specified for the token, then the token inherits an expiration time for the column.

At 1008, the token is associated with a token resolution policy. In some embodiments, the token resolution policy is identified in the data transform policy of the relevant accessor definition. The token resolution policy includes parameters that describe conditions for granting a token resolution request. For example, the token resolution policy could dictate one or more of the following parameters: a requestor role that is permitted to resolve the token, a location of the requestor from which the requestor is permitted to resolve the token, a specified relationship between the requestor and a specified principle associated with the set of user data for whom the requestor is permitted to resolve the token, and how/if all the set of user data associated with the token should be transformed on resolution.

After an entity receives a token that is generated using a process such as process 1000 of FIG. 10, the entity can inspect the token, exchange it for an updated token, resolve the token, or delete the token. To inspect the token, the token holding entity can send an examine request (ExamineTokens (token array)) to the user data management server. The user data management server will process the examine request and return metadata about the token, what data use purpose was it issued for, which API issued it, when was it issued, and whether the raw data backing the token still exists.

Figure 11:
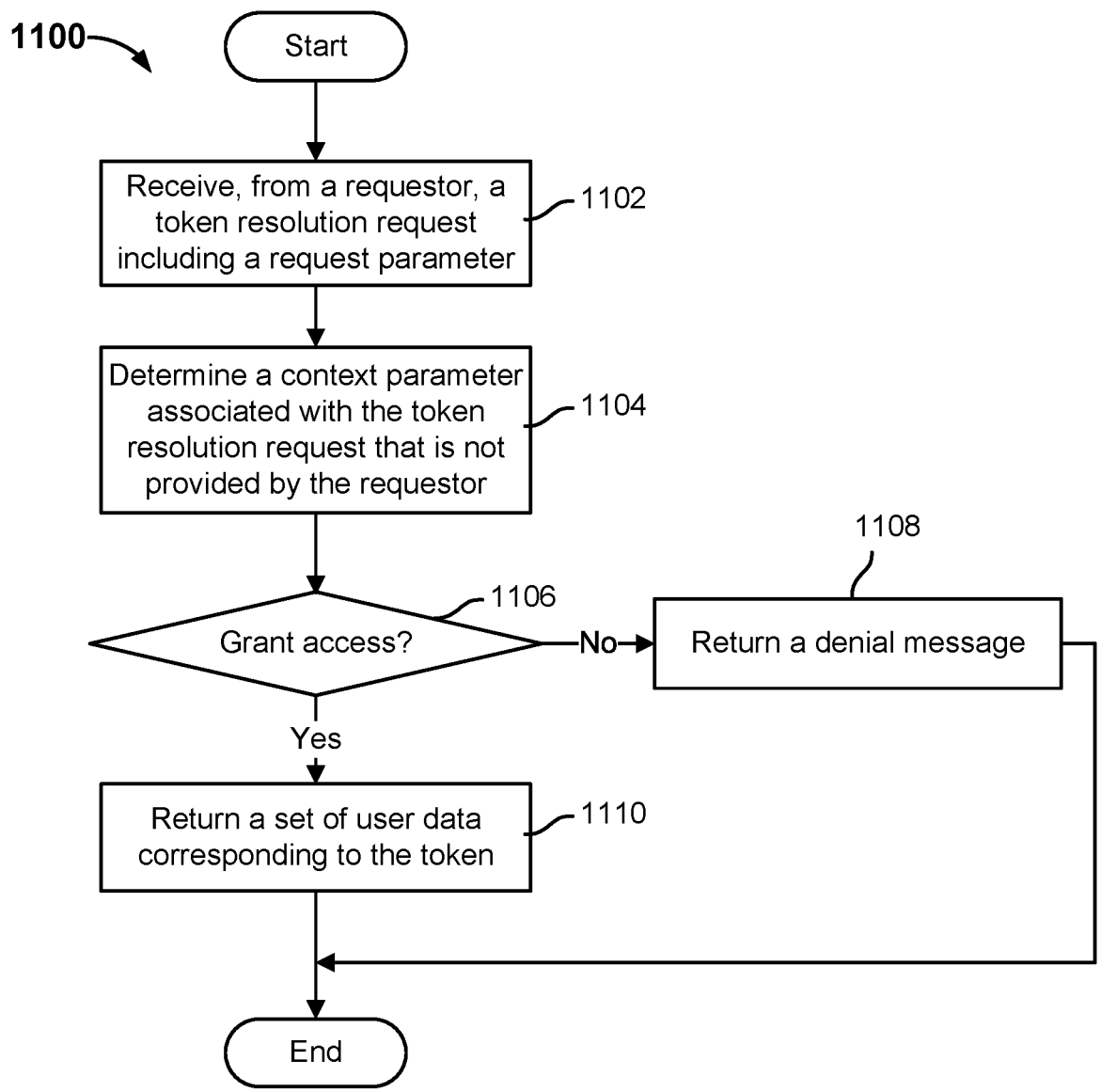
FIG. 11 is a flow diagram showing an example of a process for resolving a token in accordance with some embodiments.

To resolve the token, the token holding entity can send a token resolution request to the user data management server and the user data management server can handle such a request using a process, such as the one described in FIG. 11.

One example is the marketing service server obtains a token that is backed by a customer's end user's email. After some time, the customer requests that the marketing service server sends a marketing email to that end user. In response to this request from the customer, the marketing service server can send a token resolution request to the user data management server to obtain the end user's email in order to send the marketing email.

FIG. 11 is a flow diagram showing an example of a process for resolving a token in accordance with some embodiments. In some embodiments, process 1100 is implemented by user data management server 102 of FIG. 1.

At 1102, a token resolution request including a request parameter is received from a requestor. The token resolution request includes one or more request parameters that are provided by the requestor of the request. Examples of request parameters include identifying information associated with a token (for which the set of user data backing that token is requested) and a use/purpose for the requested user data. Examples of identifying information associated with the token comprise the token itself or a token ID. In some embodiments, the token holding entity can resolve the token by sending the following example type of request: ResolveTokens (token array, data purpose, application boundary ID, documentation ID). The ResolveTokens method returns raw user data behind the token given that incoming information matches the policies on the column containing the data, such as described below in process 1100, and the token has not been bound to a specific custom API for token resolution. If a custom API is associated, the token would only be resolvable through a call to that API. Members of an administrative group can resolve any token with this API if they specify "force resolution flag."

At 1104, a context parameter associated with the token resolution request that is not provided by the requestor is determined. While a request parameter can be specified by the requestor as an argument in the token resolution request, in contrast, a context parameter associated with the token resolution request is not passed in as an argument in the token resolution request and is instead derived from the metadata of the token resolution request and/or queried from a third-party server regarding the token resolution request. A first example of a context parameter is a time of day and this can be derived from the metadata associated with the token resolution request. A second example of a context parameter is an origin location of the request, which could be derived from the IP address associated with the requestor. A third example of a context parameter is a role or a set of permissions that are associated with the requestor and can be determined by querying an authorization server based on identifying information (e.g., an authentication token) of the requestor that is provided in the token resolution request as a request parameter.

In a specific example, the token resolution request includes as the request parameters the following: a token value, a purpose of technical support, the name of the customer support agent, and the name of an end user for which support is desired. In this specific example, the token resolution request is intended to retrieve the user data that backs the passed in token value, which should be user data of the end user for which the technical support is sought. A context parameter in this example can be obtained by querying a third-party server that manages customer support tickets to determine the following context parameter: whether there exists a ticket that identifies the customer support agent in the token resolution request as being assigned to provide support to the end user in the token resolution request.

At 1106, whether access to a set of user data backing the token is determined. In the event that access to a set of user data backing the token is granted, control is transferred to 1110. Otherwise, in the event that access to a set of user data backing the token is denied, control is transferred to 1108. In the event that a token store entry that includes the token identified in the token resolution request can be found, then the token resolution policy that is identified by that entry is evaluated against the request parameter(s) and context parameter(s) associated with the token resolution request. Specifically, the conditions described by the token resolution policy to grant resolution of the token are compared to the request parameter(s) and context parameter(s) associated with the token resolution request to determine whether the parameters meet those conditions.

At 1108, a denial message is returned. In the event that the conditions described by the token resolution policy were not met by the parameters, then a denial message is returned.

At 1110, a set of user data corresponding to the token is returned. In the event that the conditions described by the token resolution policy were met by the parameters, then the set of user data that is included in the matching token store entry is returned. In some embodiments, in the event that the token resolution policy indicates to first transform (e.g., by injecting noise into or obfuscating a portion of) the set of user data, then the set of user data is first transformed and then the transformed data is returned to the requestor.

Figure 12:
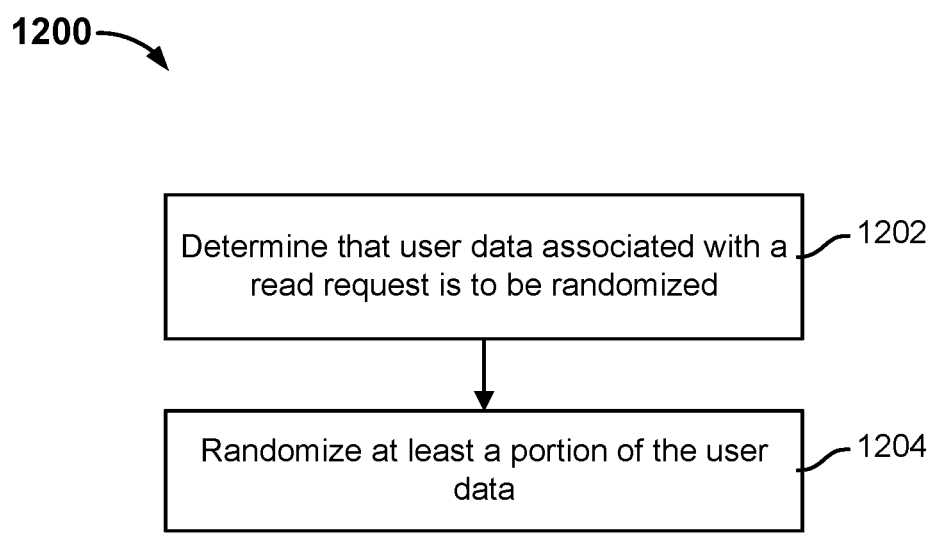
FIG. 12 is a flow diagram showing an example of a process for performing a randomization type of data transformation on read user data in accordance with some embodiments.

FIG. 12 is a flow diagram showing an example of a process for performing a randomization type of data transformation on read user data in accordance with some embodiments. In some embodiments, process 1200 is implemented at user data management server 102 of FIG. 1. In some embodiments, step 924 of process 900 of FIG. 9 can be implemented using process 1200.

At 1202, it is determined that user data associated with a read request is to be randomized.

At 1204, at least a portion of the user data is randomized. In various embodiments, randomization involves randomly changing at least a portion of the user data. The following is an example of changing the raw data i.e., 40.689263 −74.044505 (DD) to 40.689263+random(−.100,100) −74.044505 (DD)+random(−.100,100)

In some embodiments, a randomization function can be defined by the customer in the data transform parameter of an accessor definition or the customer can reference a pre-defined "transformation function" in the data transform parameter of an accessor definition. Either way the randomization can be defined as static (i.e., independent of the data stored) or dynamic (i.e., ensuring certain a property across the data stored similar to at least X users in a bucket).

Figure 13:
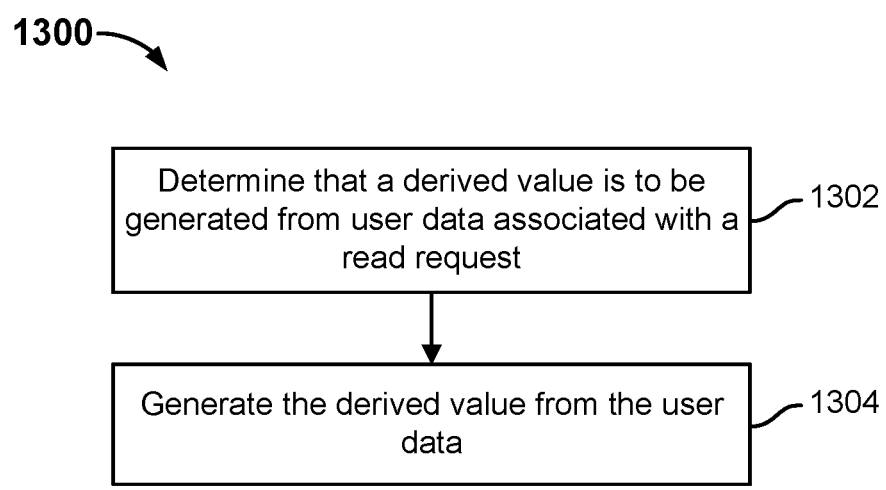
FIG. 13 is a flow diagram showing an example of a process for performing a derivation type of data transformation on read user data in accordance with some embodiments.

FIG. 13 is a flow diagram showing an example of a process for performing a derivation type of data transformation on read user data in accordance with some embodiments. In some embodiments, process 1300 is implemented at user data management server 102 of FIG. 1. In some embodiments, step 924 of process 900 of FIG. 9 can be implemented using process 1300.

At 1302, it is determined that a derived value is to be generated from user data associated with a read request.

At 1304, the derived value is generated from the user data. A value that is derived from the requested user data can be an abstracted version of the original user data or a portion of the original user data. In a first example, a value that is derived from the user data of the birthday of 11/7/2000 is the age range of 20 to 30 years old. In a second example, a value that is derived from the user data of phone number (650) 555-5555 is (650) xxx-xxxx.

In some embodiments, members of the administrator group of a customer may be granted special accesses via administrative APIs. Such administrative APIs, by default, provide full data access to members of the administrator group. The administrative APIs can be disabled in the configuration of the user data store. The following are examples of such administrative APIs:

GetUserData("Column Names", "Filter", "Pagination Settings")// This method can be used to perform a full export of data from the user data store.

InsertUserData("Column Names", "Array of user data")

A recommended practice is to only use these APIs for non-operational purposes such as migration or initial deployment and instead use purpose-defined custom accessor definitions (APIs) for online and offline operational purposes.

Figure 14:
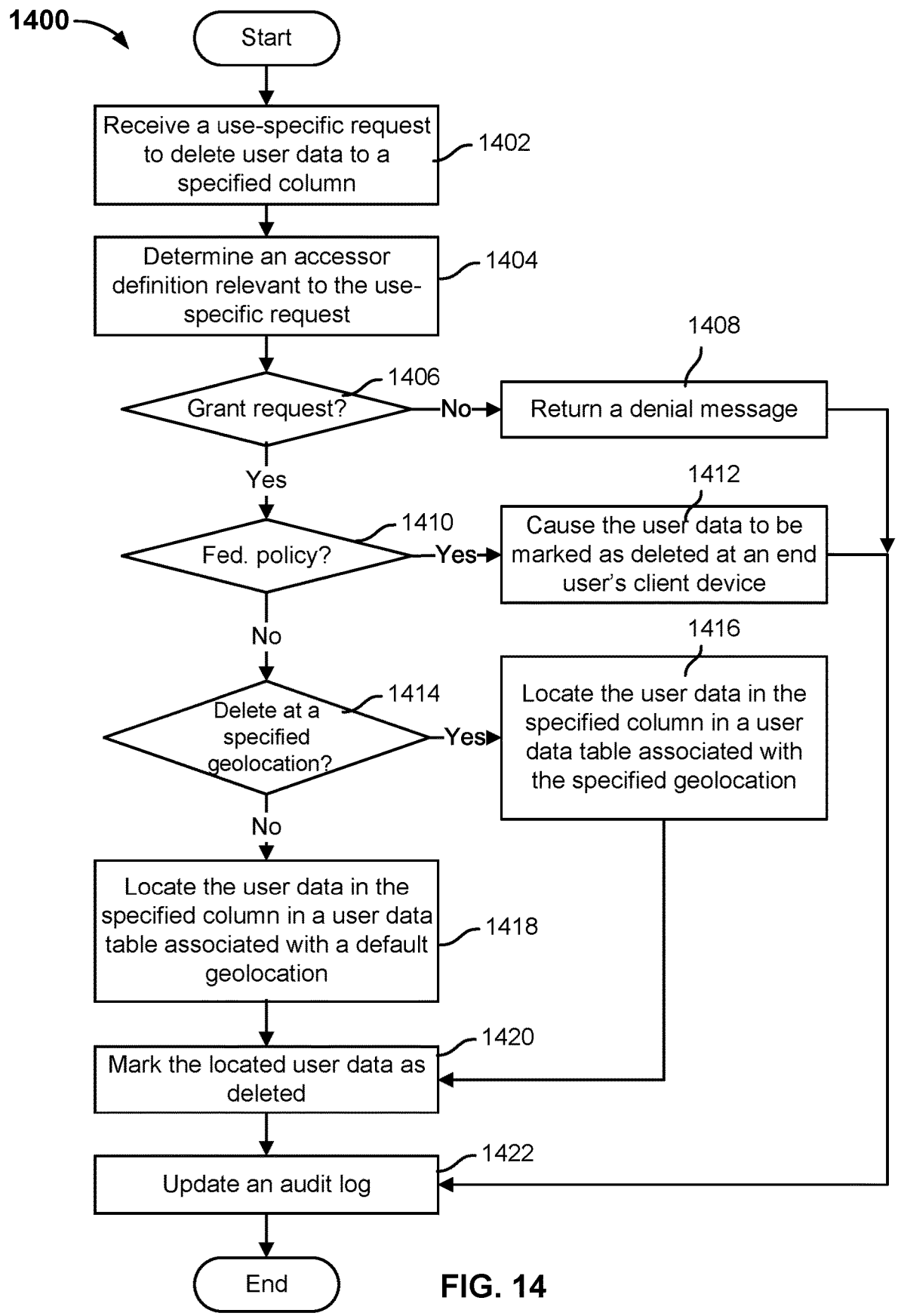
FIG. 14 is a flow diagram showing an example of a process for handling a use-specific request to delete user data in accordance with some embodiments.

FIG. 14 is a flow diagram showing an example of a process for handling a use-specific request to delete user data in accordance with some embodiments. In some embodiments, process 1400 is implemented at user data management server 102 of FIG. 1.

At 1402, a use-specific request to delete user data in a column is received. The request comprises an invocation of a specified API for updating user data, the identifying information associated with user data that is to be deleted from a particular column in a user data table, and a specified use/purpose.

At 1404, an accessor definition relevant to the use-specific request is determined. The accessor (API) definition corresponding to the specified delete API is retrieved from storage. The column of a user data table to which the user data is requested to be stored is specified in the ("column name" configuration field of the) relevant accessor definition.

At 1406, whether the use-specific request to delete user data is granted is determined. In the event that the use-specific request to delete user data is granted, control is transferred to 1410. Otherwise, in the event that the use-specific request to delete user data is denied, control is transferred to 1408. In various embodiments, whether the use-specific request to delete user data is granted is determined based at least in part on an access policy that is referenced by the accessor definition that is relevant to the API specified by the request. The relevant accessor definition (a delete API definition) includes an access policy that describes the roles that are authorized to access the API and also a set of permitted uses of the API. A role is determined for the requestor based on a requestor identity that is determined from the request and is compared to the authorized roles in the accessor definition's access policy. The use that is specified in the request is also compared to the set of permitted uses in the accessor definition's access policy. In some embodiments, the request is granted only if both the role of the requestor matches an authorized role and the specified use matches a permitted use.

In some embodiments, in addition to the access policy of the accessor definition, the global access policy, if one has been set by the column definitions for the column that is specified in the relevant accessor definition, is also evaluated against the arguments/requestor roles of the request to confirm that the request can be granted.

In some embodiments, in addition to the access policy of the accessor definition, an out-of-phase approval (e.g., a verification prompt is sent to the device of an administrator user of the customer to receive approval of the request) is executed in accordance with the approval policy, if one has been set in the relevant accessor definition, before the request can be granted.

At 1408, a denial message is returned. Where the request is not determined to be granted and/or the user data of the request cannot be validated, a denial message is sent back to the requestor to indicate that the request cannot be completed.

At 1410, whether the user data associated with the use-specific request is subject to a federation policy is determined. In the event that the user data associated with the use-specific request is subject to a federation policy, control is transferred to 1412. Otherwise, in the event that the user data associated with the use-specific request is not subject to a federation policy, control is transferred to 1414. In the event that the specified column is subject to a federation policy that has been defined for that column in the column definitions, then the user data associated with the request must be deleted from a client device of the end user associated with that data. Otherwise, if no such federation policy has been configured for that specified column, then the user data associated with the request is to be deleted from a user data store.

At 1412, the user data is caused to marked as deleted at an end user's client device. In some embodiments, the user data, which is locally stored at a client device, that is requested to be deleted is marked for deletion and is retained in accordance with a retention policy associated with federated data. For example, the retention policy may indicate to retain the user data for a predetermined length of time to meet compliance requirements or fraud detection interests.

At 1414, whether the user data associated with the use-specific request is to be deleted in a specified geolocation is determined. In the event that the user data associated with the use-specific request is stored at a specified geolocation, control is transferred to 1416. Otherwise, in the event that the user data associated with the use-specific request is not stored at a specified geolocation, control is transferred to 1418. In the event that the specified column is subject to a geographic distribution policy that has been defined for that column in the column definitions, then the user data to be deleted must have been stored in an instance of the user data store that is located in the geolocation that is specified in the geographic distribution policy. Otherwise, the user data to be deleted must have been stored at a user data store in a default geolocation (e.g., the location closest to the location from which the request had originated).

At 1416, the user data is located in the specified column in a user data table in the specified geolocation.

At 1418, the user data is located in the specified column in a user data table in a default geolocation.

At 1420, the located user data is marked as deleted. In some embodiments, the user data that is requested to be deleted is marked for deletion and is retained in accordance with a retention policy for the user data store. For example, the retention policy may indicate to retain the user data for a predetermined length of time to meet compliance requirements or fraud detection interests.

At 1422, an audit log is updated. The audit log is updated with information such as one or more of the following: information about the use-specific request (e.g., the invoked API, the arguments included therein), whether the request was granted, the policies that had applied to the request, and any special auditing features that are triggered by an applicable policy.

Various embodiments of user data management as described herein provide at least the following benefits:

Keeps personal information in one place—Today, customer information, like emails or phone numbers, flows out into many other systems. Some old, some new—but too many to track. The system can tokenize personal information (e.g., replace it with unique identifiers) and issue per-purpose user IDs as data flows into external systems. This way external systems and teams only have access to personal information they really need, and a single access audit log can be maintained to verify behavior (e.g., requests made by external systems).

Data Residency provides compliance by design—The system can store data in each customer's country as required by existing or upcoming legislation. Country-specific storage can be easily enabled in the configuration of the system. The system keeps track of user consents, collection purposes, and end use as required by laws from COPPA to GDPR to CCPA.

Data Security—The system is designed to allow management of user data with different levels of encryption while preserving a unified API. This allows customers (e.g., application developers) to protect both their company and their end users, and to comply with the law without slowing down product development.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory; and
   a processor coupled to the memory and configured to:
      receive a use-specific request to read a set of user data;
      determine whether to grant the use-specific request based at least in part on an access policy associated with an accessor definition associated with the use-specific request, including to:
         determine the accessor definition that is invoked by the use-specific request;
         determine the access policy associated with the accessor definition; and
         determine whether a specified use in the use-specific request matches a specified permitted use in the access policy; and
      in response to a determination to grant the use-specific request:
         read the set of user data from a column of a user data table that is specified in the accessor definition; and
         transform the set of user data based at least in part on the accessor definition.

2. The system of claim 1, wherein the processor is further configured to:
   receive column definitions associated with the user data table associated with a customer; and
   receive a plurality of accessor definitions associated with the customer, wherein the plurality of accessor definitions includes the accessor definition.

3. The system of claim 1, wherein the accessor definition specifies an application programming interface (API) name, a read operation type, the column of the user data table, and the access policy.

4. The system of claim 1, wherein to determine whether to grant the use-specific request comprises to:

determine a role associated with a requestor of the use-specific request; and
determine whether the role matches an authorized role as specified in the access policy.

5. The system of claim 1, wherein the processor is further configured to:
determine whether the column specified by the accessor definition to which the set of user data is to be read is subject to a federation policy as specified in a set of column definitions;
in the event that the column is subject to the federation policy, send a prompt to a client device to obtain approval to read the set of user data; and
cause the set of user data to be read from the client device.

6. The system of claim 1, wherein the processor is further configured to:
determine whether the column specified by the accessor definition to which the set of user data is to be read is subject to a federation policy as specified in a set of column definitions; and
in the event that the column is not subject to the federation policy, read the set of user data from a user data store.

7. The system of claim 6, where to read the set of user data from the user data store comprises to:
determine whether the column specified by the accessor definition to which the set of user data is to be read is subject to a geographic distribution policy as specified in the set of column definitions; and
in the event that the column is subject to the geographic distribution policy, read the set of user data from an instance of the user data store in a location as specified in the geographic distribution policy.

8. The system of claim 6, where to read the set of user data from the user data store comprises to:
determine whether the column specified by the accessor definition to which the set of user data is to be read is subject to a geographic distribution policy as specified in the set of column definitions; and
in the event that the column is not subject to the geographic distribution policy, read the set of user data from an instance of the user data store in a default location.

9. The system of claim 1, wherein to transform the set of user data based at least in part on the accessor definition comprises to tokenize the set of user data based on a data transform policy as specified in the accessor definition.

10. The system of claim 9, wherein to tokenize the set of user data comprises to:
generate a token corresponding to the set of user data based at least in part on a token generation policy;
store a mapping between the token and the set of user data in a token store; and
associate the token with a token resolution policy.

11. The system of claim 10, wherein the processor is further configured to:
receive a token resolution request including a request parameter and identifying information associated with the token;
determine a context parameter associated with the token resolution request that is not provided by a requestor of the token resolution request;
determine whether to grant the token resolution request based at least in part on the request parameter, the context parameter, and the token resolution policy; and
in response to a determination to grant the token resolution request, return the set of user data associated with the token.

12. The system of claim 1, wherein to transform the set of user data based at least in part on the accessor definition comprises to randomize at least a portion of the set of user data based on a data transform policy as specified in the accessor definition.

13. The system of claim 1, wherein to transform the set of user data based at least in part on the accessor definition comprises to generate a derived value from the set of user data based on a data transform policy as specified in the accessor definition.

14. The system of claim 1, wherein the use-specific request to read the set of user data comprises a first use-specific request, and wherein the processor is further configured to receive a second use-specific request to create the set of user data.

15. The system of claim 1, wherein the use-specific request to read the set of user data comprises a first use-specific request, and wherein the processor is further configured to receive a second use-specific request to update the set of user data.

16. The system of claim 1, wherein the use-specific request to read the set of user data comprises a first use-specific request, and wherein the processor is further configured to receive a second use-specific request to delete the set of user data.

17. A method, comprising:
receiving a use-specific request to read a set of user data;
determining whether to grant the use-specific request based at least in part on an access policy associated with an accessor definition associated with the use-specific request, including:
determining the accessor definition that is invoked by the use-specific request;
determining the access policy associated with the accessor definition; and
determining whether a specified use in the use-specific request matches a specified permitted use in the access policy; and
in response to a determination to grant the use-specific request:
reading the set of user data from a column of a user data table that is specified in the accessor definition; and
transforming the set of user data based at least in part on the accessor definition.

18. The method of claim 17, further comprising:
receiving column definitions associated with the user data table associated with a customer; and
receiving a plurality of accessor definitions associated with the customer, wherein the plurality of accessor definitions includes the accessor definition.

19. The method of claim 17, wherein the accessor definition specifies an application programming interface (API) name, a read operation type, the column of the user data table, and the access policy.

20. A computer program product, the computer program product being embodied in a non-transitory computer readable storage medium comprising computer instructions for:
receiving a use-specific request to read a set of user data;
determining whether to grant the use-specific request based at least in part on an access policy associated with an accessor definition associated with the use-specific request, including:
determining the accessor definition that is invoked by the use-specific request;
determining the access policy associated with the accessor definition; and determining whether a specified use in the use-specific request matches a specified permitted use in the access policy; and in response to a determination to grant the use-specific request:

reading the set of user data from a column of a user data table that is specified in the accessor definition; and transforming the set of user data based at least in part on the accessor definition.

\* \* \* \* \*